(12) United States Patent
Omagari et al.

(10) Patent No.: US 10,013,221 B2
(45) Date of Patent: Jul. 3, 2018

(54) INFORMATION PROCESSING APPARATUS THAT GENERATES PRINT DATA USING AN APPLICATION WITH TWO PROGRAM LAYERS, METHOD OF CONTROLLING THE SAME, AND NON-TRANSITORY COMPUTER-READABLE MEDIUM

(71) Applicant: CANON KABUSHIKI KAISHA, Tokyo (JP)

(72) Inventors: Yuki Omagari, Tokyo (JP); Kiyoshi Umeda, Kawasaki (JP); Hiroyuki Sakai, Chigasaki (JP); Tomohiro Suzuki, Kawasaki (JP); Naoki Sumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/460,641

(22) Filed: Mar. 16, 2017

(65) Prior Publication Data
US 2017/0286022 A1    Oct. 5, 2017

(30) Foreign Application Priority Data
Mar. 30, 2016    (JP) ................................. 2016-069278

(51) Int. Cl.
*G06K 15/00* (2006.01)
*G06F 3/12* (2006.01)
(52) U.S. Cl.
CPC ............ *G06F 3/125* (2013.01); *G06F 3/1205* (2013.01); *G06F 3/1206* (2013.01); *G06F 3/1241* (2013.01); *G06F 3/1256* (2013.01); *G06F 3/1287* (2013.01)

(58) Field of Classification Search
None
See application file for complete search history.

(56) References Cited

U.S. PATENT DOCUMENTS

| 8,045,795 | B2 * | 10/2011 | Umeda ................ G06K 9/0061 382/167 |
| 9,436,413 | B2 | 9/2016 | Mizoguchi et al. |
| 9,465,571 | B2 | 10/2016 | Kato et al. |
| 9,471,284 | B2 | 10/2016 | Kurokawa et al. |
| 9,582,232 | B2 | 2/2017 | Umeda et al. |

(Continued)

FOREIGN PATENT DOCUMENTS

JP    2015-026393 A    2/2015

*Primary Examiner* — Henok A Shiferaw
(74) *Attorney, Agent, or Firm* — Fitzpatrick, Cella, Harper & Scinto

(57) ABSTRACT

An information processing apparatus decides a division condition of an image to be laid out in a print content based on at least one of information of the image and information of the information processing apparatus by causing at least one of a first program layer and second program layer to operate; divides the image in accordance with the division condition decided and creates a divided image by causing the second program layer to operate; constructs the print content in which the divided image is laid out by causing at least one of the first program layer and second program layer to operate; renders the print content in which the divided image is laid out and generate a rendering image by causing the second program layer to operate; and generates print data using the rendering image by causing the second program layer to operate.

20 Claims, 20 Drawing Sheets

(56) References Cited

U.S. PATENT DOCUMENTS

| | | | |
|---|---|---|---|
| 2002/0175928 A1* | 11/2002 | Kanbayashi | H01L 27/3211 345/697 |
| 2007/0003139 A1* | 1/2007 | Gotoh | G06K 9/00456 382/173 |
| 2010/0115398 A1* | 5/2010 | Yi | G06F 3/0488 715/234 |
| 2012/0320390 A1* | 12/2012 | Mori | G06K 15/1851 358/1.9 |
| 2015/0363144 A1 | 12/2015 | Suzuki et al. | |
| 2015/0365546 A1 | 12/2015 | Umeda et al. | |
| 2015/0378643 A1 | 12/2015 | Sumi et al. | |
| 2015/0378645 A1* | 12/2015 | Kunieda | G06F 3/1206 358/1.13 |
| 2015/0378653 A1 | 12/2015 | Goto et al. | |
| 2015/0379741 A1* | 12/2015 | Obayashi | H04N 1/603 345/590 |

* cited by examiner

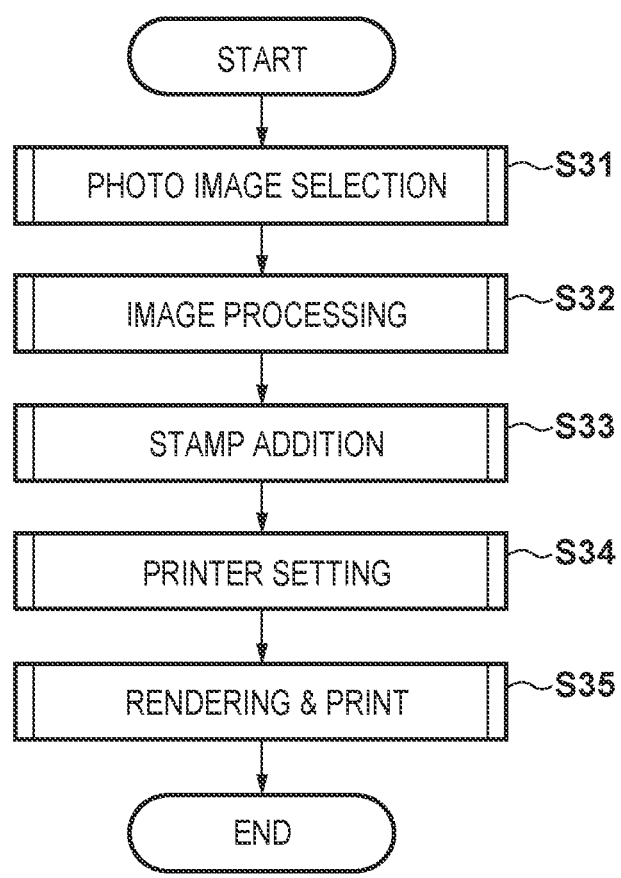

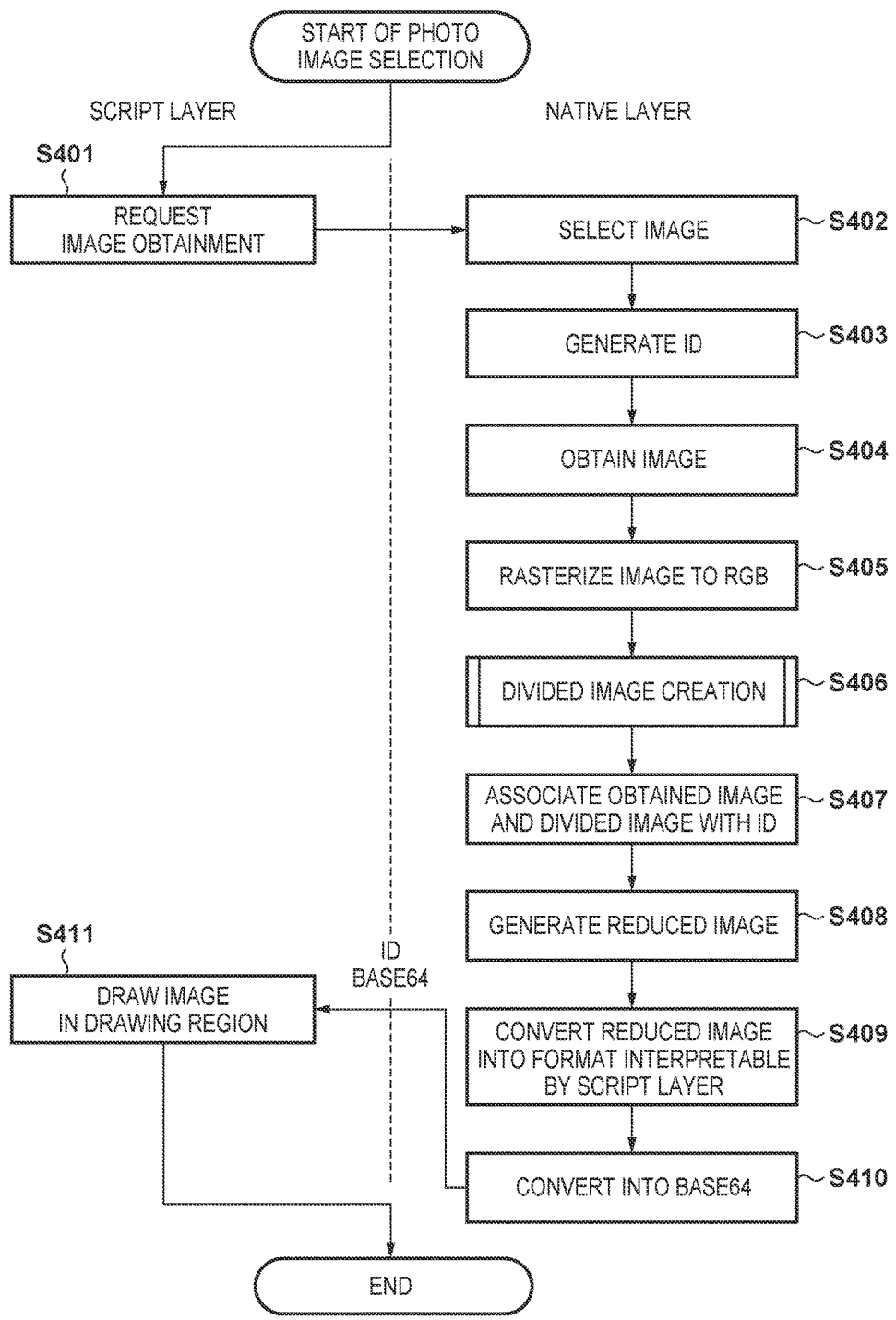

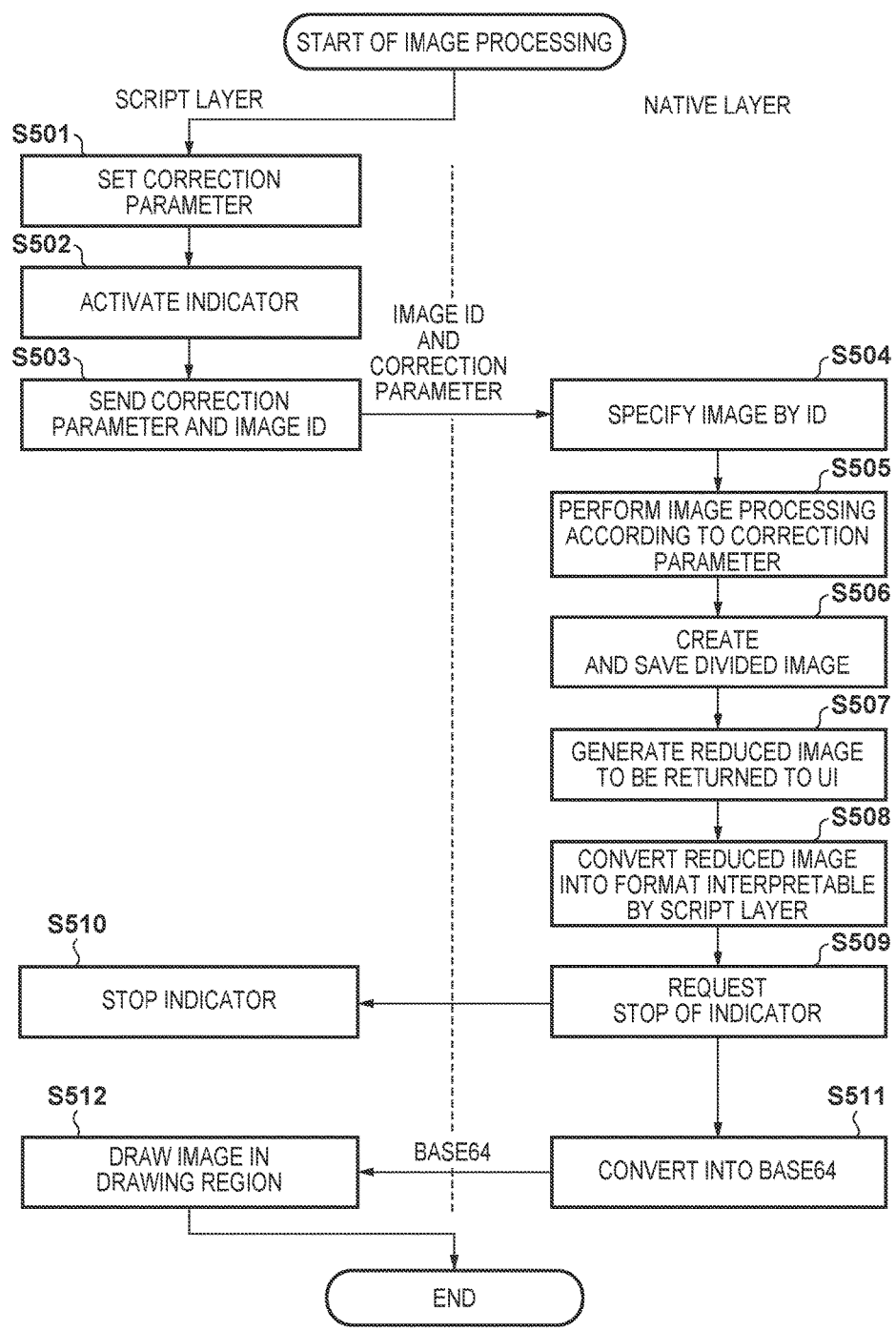

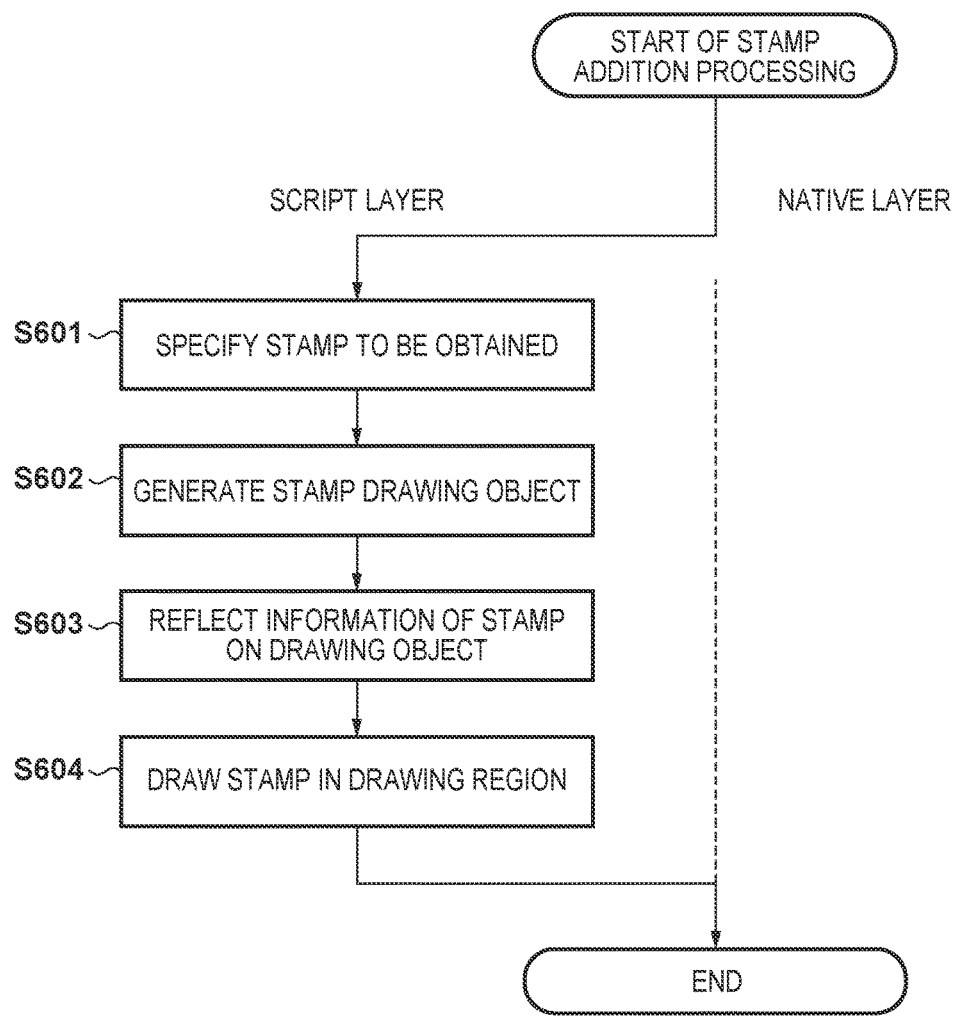

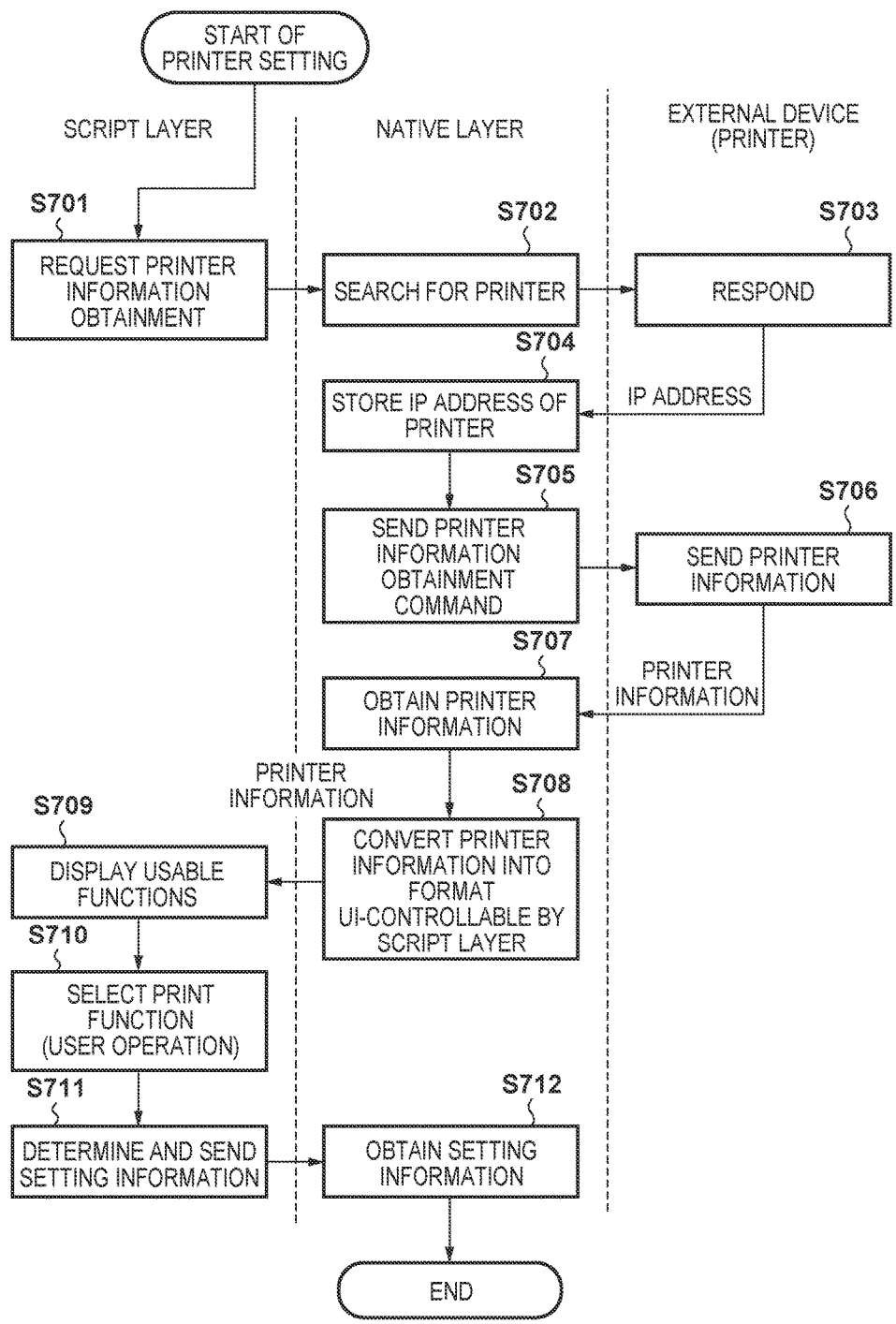

FIG. 10
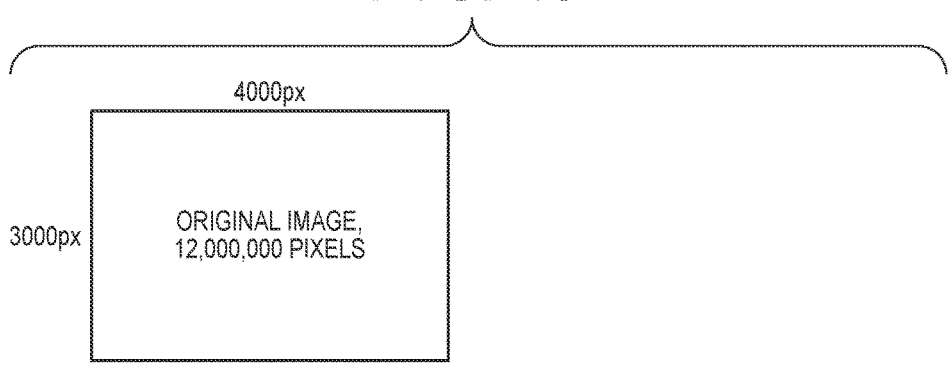
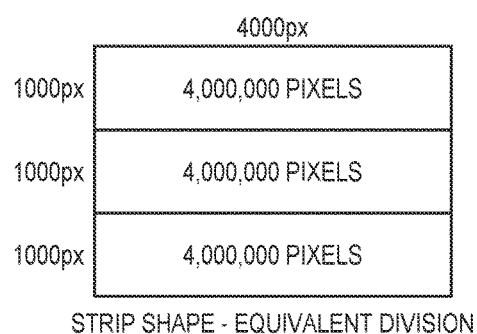
STRIP SHAPE - EQUIVALENT DIVISION
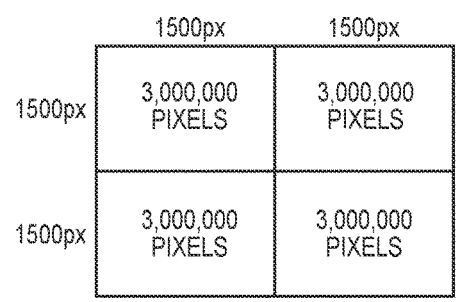
TILE SHAPE - EQUIVALENT DIVISION
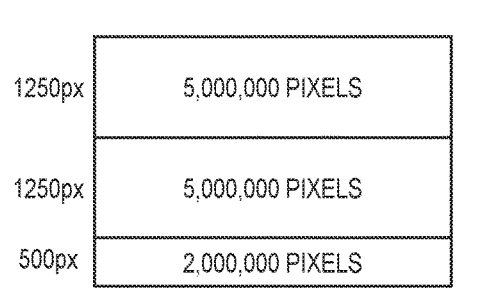
STRIP SHAPE - UPPER LIMIT DIVISION
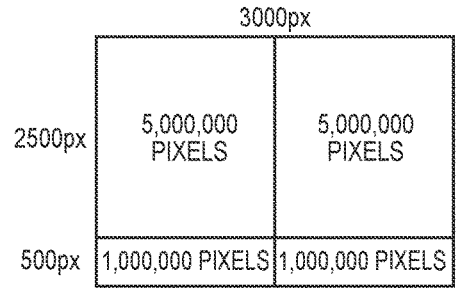
TILE SHAPE - UPPER LIMIT DIVISION

SVG OF 4005 × 3000

SVG DISPLAY SCREEN

EXAMPLE OF
UPPER HALF OBTAINMENT

SVG SHIFTED BY 1500
IN VERTICAL DIRECTION

SVG DISPLAY SCREEN

EXAMPLE OF
LOWER HALF OBTAINMENT

F I G. 13

■ OS TYPE AND VERSION INFORMATION

○ : EXECUTE   × : NO EXECUTION

| | | version | 4 OR LESS | 5 | 6 | 7 | 8 | 9 |
|---|---|---|---|---|---|---|---|---|
| A OS | | IMAGE DIVISION | ○ | ○ | ○ | ○ | ○ | × |
| | | UPPER LIMIT OF NUMBER OF PIXELS IN DIVISION | 3,000,000 | 3,000,000 | 5,000,000 | 5,000,000 | 5,000,000 | - |

| | | version | 2 OR LESS | 3 | 4 | 5 | 6 OR MORE |
|---|---|---|---|---|---|---|---|
| B OS | | IMAGE DIVISION | ○ | ○ | × | × | × |
| | | UPPER LIMIT OF NUMBER OF PIXELS IN DIVISION | 3,000,000 | 3,000,000 | - | - | - |

■ MEMORY (RAM) SIZE

| | | UNIT : MB | 256 OR LESS | 512 | 1024 | 2048 OR MORE |
|---|---|---|---|---|---|---|
| COMMON TO OS | | IMAGE DIVISION | ○ | ○ | ○ | × |
| | | UPPER LIMIT OF NUMBER OF PIXELS IN DIVISION | 3,000,000 | 5,000,000 | 5,000,000 | - |

■ CPU CLOCK FREQUENCY

| | | UNIT : MHz | 500 OR LESS | 1000 | 1500 | 2000 OR MORE |
|---|---|---|---|---|---|---|
| COMMON TO OS | | IMAGE DIVISION | ○ | ○ | × | × |
| | | UPPER LIMIT OF NUMBER OF PIXELS IN DIVISION | 5,000,000 | 5,000,000 | - | - |

FIG. 14A

```
var base64Data = BASE64 DATA FROM SCRIPT LAYER;
var ID = UNIQUE ID GENERATED BY SCRIPT LAYER;
//DESIGNATE REGION TO REFLECT IMAGE
var svg = "http://www.w3.org/2000/svg";
var xlink = "http://www.w3.org/1999/xlink";
var img = document.createElementNS(svg, "image");
        img.setAttributeNS(xlink, "href", base64Data);
        img.setAttribute("id", ID);
        img.setAttribute("width", 200);
        img.setAttribute("height", 200);
var target = document.getElementById("ID OF SVG OF ADDITION DESTINATION");
        target.appendChild(img)
```

FIG. 14B

```
var json = {
        ID : IMAGE ID OF IMAGE PROCESSING TARGET,
        Brightness : 20
};
```

FIG. 15A

```
01: <?xml version="1.0" encoding="utf-8" ?>
02: <cmd xmlns:trans="http://www.xxxx/yyyyy/">
03:   <contents>
04:     <operation>GetInformation</operation>
05:   </contents>
06: </cmd>
```

FIG. 15B

```
01: <?xml version="1.0"encoding="utf-8" ?>
02: <cmd xmlns:trans="http://www.xxxx/yyyyy/">
03:   <contents>
04:     <device id="Printer001"/>
05:     <memory receive= 7680000 />
06:       <mode = 1>
07:         <media>GlossyPaper</media>
08:         <size>A4</size>
09:         <quality>1</quality>
10:         <border>no</border>
11:         <dpi x=1200 y=1200 />
12:       </mode>
13:       <mode = 2>
14:         ~OMISSION~
15:       </mode>
16:       <mode = 3>
17:         ~OMISSION~
18:       </mode>
19:         ~OMISSION~
20:   </contents>
21: </cmd>
```

FIG. 16

```
<!DOCTYPE html>
  <head>
  <title>PRINT SETTING</title>
  <script>

<!--PAPER SIZE-->
  var PaperSizeNum = GetPaperSizeNum();
  var P = document.getElementById("PaperList");
  var i;
  for(i = 0; <PaperSizeNum; i++){
    p.options[i] = new Option(GetPaperSizeT(i), GetPaperSizeV(i));
  }

<!--PAPER TYPE-->
  var MediaTypeNum = GetMediaTypeNum();
  var m = document.getElementById("MediaList");
  var j;
  for(i = 0; j<MediaTypeNum; j++){
    m.options[j] = new Option(GetMediaTypeT(j), GetMediaTypeV(j));
  }

<!--PRINT QUALITY-->
  var QualityNum = GetQualityNum();
  var q = document.getElementById("QualityList");
  var k;
  for(k = 0; k<QualityNum; k++){
    q.options[k] = new Option(GetQualityT(k), GetQualityV(k));
  }

<!--BORDERED/BORDERLESS-->
  var BorderNum = GetBorderNum();
  var b = document.getElementById("BorderList");
  var l;
  for(l = 0; l<BorderNum; l++){
    b.options[l] = new Option(GetBorderT(l), GetBorderV(l));
  }

<!--PRINT FUNCTION-->
  function printer(){
    SetPrint(document.getElementById("PaperList").value,
    documernt.getElementById("MediaList").value,
    documernt.getElementById("QualityList").value,
```

FIG. 17A

```
<svg
  xmlns="http://www.w3.org/2000/svg"
  xmlns:xlink="http://www.w3.org/1999/xlink"
  width="640" height="480" viewBox="0 0 640 480">
    <image width="640" height="480" x="0" y="0"
      xlink:href="IMAGE DATA"  id="IMAGE ID"></image>
    <image width="200" height="200" x="300" height="50"
      xlink:href="DESIGNATION OF PATH TO STAMP"
      id="ID OF STAMP"></image>
</svg>
```

FIG. 17B

```
<svg
  xmlns="http://www.w3.org/2000/svg"
  xmlns:xlink="http://www.w3.org/1999/xlink"
  width="4000" height="3000" viewBox="0 0 640 480">
    <image width="640" height="480" x="0" y="0"
      xlink:href="IMAGE DATA"  id="imageID"></image>
    <image width="200" height="200" x="300" height="50"
      xlink:href="DESIGNATION OF PATH TO STAMP"
      id="ID OF STAMP"></image>
</svg>
```

FIG. 18A

```
<svg
    xmlns="http://www.w3.org/2000/svg"
    xmlns:xlink="http://www.w3.org/1999/xlink"
    width="4000" height="3000" viewBox="0 0 640 480">
    <symbol id="imageID" viewBox="0 0 640 480">
        <image width="640" height="240" x="0" y="0"
            xlink:href="imageID_above.bmp" ></image>
        <image width="640" height="240" x="0" y="240"
            xlink:href="imageID_below.bmp" ></image>
    </symbol>
    <use xlink:href="#imageID" x="0" y="0" width="640" height="480" />
    <image width="200" height="200" x="300" height="50"
        xlink:href="DESIGNATION OF PATH TO STAMP"
        id="ID OF STAMP"></image>
</svg>
```

FIG. 18B

```
<svg
    xmlns="http://www.w3.org/2000/svg"
    xmlns:xlink="http://www.w3.org/1999/xlink"
    width="4005" height="3000" viewBox="0 0 4005 3000">
    <svg  width="4000" height="3000" viewBox="0 0 640 480">
        <symbol id="imageID" viewBox="0 0 640 480">
            <image width="640" height="240" x="0" y="0"
                xlink:href="imageID_above.bmp" ></image>
            <image width="640" height="240" x="0" y="240"
                xlink:href="imageID_below.bmp" ></image>
        </symbol>
        <use xlink:href="#imageID" x="0" y="0" width="640" height="480" />
        <image width="200" height="200" x="300" height="50"
            xlink:href="DESIGNATION OF PATH TO STAMP"
                id="ID OF STAMP"></image>
    </svg>
    <rect x="4000" y="0" width="5" height="100%" fill="red" />
</svg>
```

FIG. 19A

```
<svg
    xmlns="http://www.w3.org/2000/svg"
    xmlns:xlink="http://www.w3.org/1999/xlink"
    width="4005" height="3000" viewBox="0 0 4005 3000">
    <svg width="4000" height="3000" viewBox="0 0 640 480">
        <symbol id="imageID" viewBox="0 0 640 480">
            <image width="640" height="240" x="0" y="0"
                xlink:href="imageID_above.bmp" ></image>
            <image width="640" height="240" x="0" y="240"
                xlink:href="imageID_below.bmp" ></image>
        </symbol>
        <use xlink:href="#imageID" x="0" y="0" width="640" height="480" />
        <image width="200" height="200" x="300" height="50"
            xlink:href="DESIGNATION OF PATH TO STAMP"
            id="ID OF STAMP"></image>
    </svg>
    <rect x="4000" y="0" width="5" height="100%" fill="red"/>
</svg>
```

FIG. 19B

```
<svg
    xmlns="http://www.w3.org/2000/svg"
    xmlns:xlink="http://www.w3.org/1999/xlink"
    width="4005" height="3000" viewBox="0 0 4005 3000">
    <svg x="0" y="0">
        <svg width="4000" height="3000" viewBox="0 0 640 480">
            <symbol id="imageID" viewBox="0 0 640 480">
                <image width="640" height="240" x="0" y="0"
                    xlink:href="imageID_above.bmp" ></image>
                <image width="640" height="240" x="0" y="240"
                    xlink:href="imageID_below.bmp" ></image>
            </symbol>
            <use xlink:href="#imageID" x="0" y="0" width="640" height="480" />
            <image width="200" height="200" x="300" height="50"
                xlink:href="DESIGNATION OF PATH TO STAMP"
                id="ID OF STAMP"></image>
        </svg>
        <rect x="4000" y="0" width="5" height="3000" fill="red" />
    </svg>
</svg>
```

INFORMATION PROCESSING APPARATUS THAT GENERATES PRINT DATA USING AN APPLICATION WITH TWO PROGRAM LAYERS, METHOD OF CONTROLLING THE SAME, AND NON-TRANSITORY COMPUTER-READABLE MEDIUM

BACKGROUND OF THE INVENTION

Field of the Invention

The present invention relates to an information processing apparatus, a method of controlling the same, and a non-transitory computer-readable medium.

Description of the Related Art

In recent years, multifunction portable terminals (to be referred to as mobile computers hereinafter) are becoming widespread. There exist mainly two forms of applications operating on such a mobile computer, that is, native applications and web applications. A native application is an application normally developed using a development environment and a development language prepared on an OS basis. In addition, the native application is compiled in advance in each development environment and converted from a so-called high-level language understandable by a human into an instruction set group of an assembler or the like interpretable by the CPU of a computer. The advantage of the native application is the ability to perform a high-speed operation because the CPU directly interprets an instruction. On the other hand, a web application is an application that operates on a standard web browser incorporated in the OS on each computer. The web application is described in a web standard language so that it can be interpreted by the web browser. The advantage of the web application is the ability to operate in any environment where the web browser operates.

The form of a hybrid application holding both the advantage of the native application and that of the web application has recently received attention. All or most of the user interfaces (UIs) of the hybrid application are described in a web standard language. In addition, a function described in a native language can be used from contents described in the web standard language. That is, both a script layer and a native layer by the web standard language are included in one application.

Japanese Patent Laid-Open No. 2015-026393 proposes an arrangement in which a portable terminal generates print data having a format interpretable by a printer using web data and sends the print data to a printer.

In Japanese Patent Laid-Open No. 2015-026393, however, a size limitation in display of web data is not taken into consideration. For example, when displaying a content in which images are laid out using a function of a web, the image size may be limited to perform high-speed display. Since the function of the web assumes display, and a high-resolution image lowers display performance, a limitation is imposed on the OS side.

For the above-described reason, when printing a content including a high-resolution image using a function of a web, the image size is limited, and the quality of a printed product decreases.

SUMMARY OF THE INVENTION

The present invention has been made in consideration of the above-described problem, and obtains a high-quality printed product even when printing a print content including a high-resolution image using a function of a web.

According to one aspect of the present invention, there is provided an information processing apparatus in which an application including a first program layer including an instruction set to be translated and executed by a processor and a second program layer including an instruction set to be translated in advance and executed by the processor can operate, comprising: a decision unit configured to decide a division condition of an image to be laid out in a print content based on at least one of information of the image and information of the information processing apparatus by causing at least one of the first program layer and the second program layer to operate; a division unit configured to divide the image in accordance with the division condition decided by the decision unit and create a divided image by causing the second program layer to operate; a construction unit configured to construct the print content in which the divided image is laid out by causing at least one of the first program layer and the second program layer to operate; a rendering unit configured to render the print content in which the divided image is laid out and generate a rendering image by causing the second program layer to operate; and a generation unit configured to generate print data using the rendering image by causing the second program layer to operate.

According to another aspect of the present invention, there is provided a method of controlling an information processing apparatus in which an application including a first program layer including an instruction set to be translated and executed by a processor and a second program layer including an instruction set to be translated in advance and executed by the processor can operate, comprising: deciding a division condition of an image to be laid out in a print content based on at least one of information of the image and information of the information processing apparatus by at least one of the first program layer and the second program layer; dividing the image in accordance with the division condition decided in the deciding and creating a divided image by the second program layer; constructing the print content in which the divided image is laid out by at least one of the first program layer and the second program layer; rendering the print content in which the divided image is laid out and generating a rendering image by the second program layer; and generating print data using the rendering image by the second program layer.

According to another aspect of the present invention, there is provided a non-transitory computer-readable medium storing a program including a first program layer including an instruction set to be translated and executed by a processor and a second program layer including an instruction set to be translated in advance and executed by the processor, the program causing a computer to function as: a decision unit configured to decide a division condition of an image to be laid out in a print content based on at least one of information of the image and information of the computer by at least one of the first program layer and the second program layer; a division unit configured to divide the image in accordance with the division condition decided by the decision unit and create a divided image by the second program layer; a construction unit configured to construct the print content in which the divided image is laid out by at least one of the first program layer and the second program layer; a rendering unit configured to render the print content in which the divided image is laid out and generate a rendering image by the second program layer;

and a generation unit configured to generate print data using the rendering image by the second program layer.

According to the present invention, it is possible to obtain a high-quality printed product even when printing a print content including a high-resolution image using a function of a web.

Further features of the present invention will become apparent from the following description of exemplary embodiments (with reference to the attached drawings).

BRIEF DESCRIPTION OF THE DRAWINGS

FIG. 3 is a flowchart showing the procedure of processing according to the present invention;

FIG. 4 is a flowchart of photo image selection processing according to the present invention;

FIG. 5 is a flowchart of image processing according to the present invention;

FIG. 6 is a flowchart of stamp addition processing according to the present invention;

FIG. 7 is a flowchart of printer setting processing according to the present invention;

FIG. 10 is a view for explaining tile division and strip division according to the present invention;

FIG. 13 is a view showing an example of a table used to decide image division conditions according to the second embodiment;

FIGS. 14A and 14B are views showing description examples of program codes according to the present invention;

FIGS. 15A and 15B are views showing description examples of a program according to the present invention;

FIG. 16 is a view showing a description example of a program according to the present invention;

FIGS. 17A and 17B are views showing description examples of a program according to the present invention;

FIGS. 18A and 18B are views showing description examples of a program according to the present invention; and FIGS. 19A and 19B are views showing description examples of a program according to the present invention.

DESCRIPTION OF THE EMBODIMENTS

The present invention will now be described in detail with reference to the accompanying drawings based on preferred embodiments.

First Embodiment

A procedure of making a photo print application as a hybrid application according to the present invention operate on a portable terminal that is a portable information processing apparatus, applying image processing to an image selected by a user, and printing the content will be described below.

Note that a content used in print is described using a web standard language (HTML (Hyper Text Markup Language), CSS, JavaScript®, or the like). In this embodiment, an explanation will be made using an example in which a print content is described in SVG (Scalable Vector Graphics) that is one of graphic notation methods in HTML. However, the present invention is not limited to this, and, for example, Canvas that is used to describe a graphic in HTML may be used.

[Hardware Arrangement]

Figure 1:
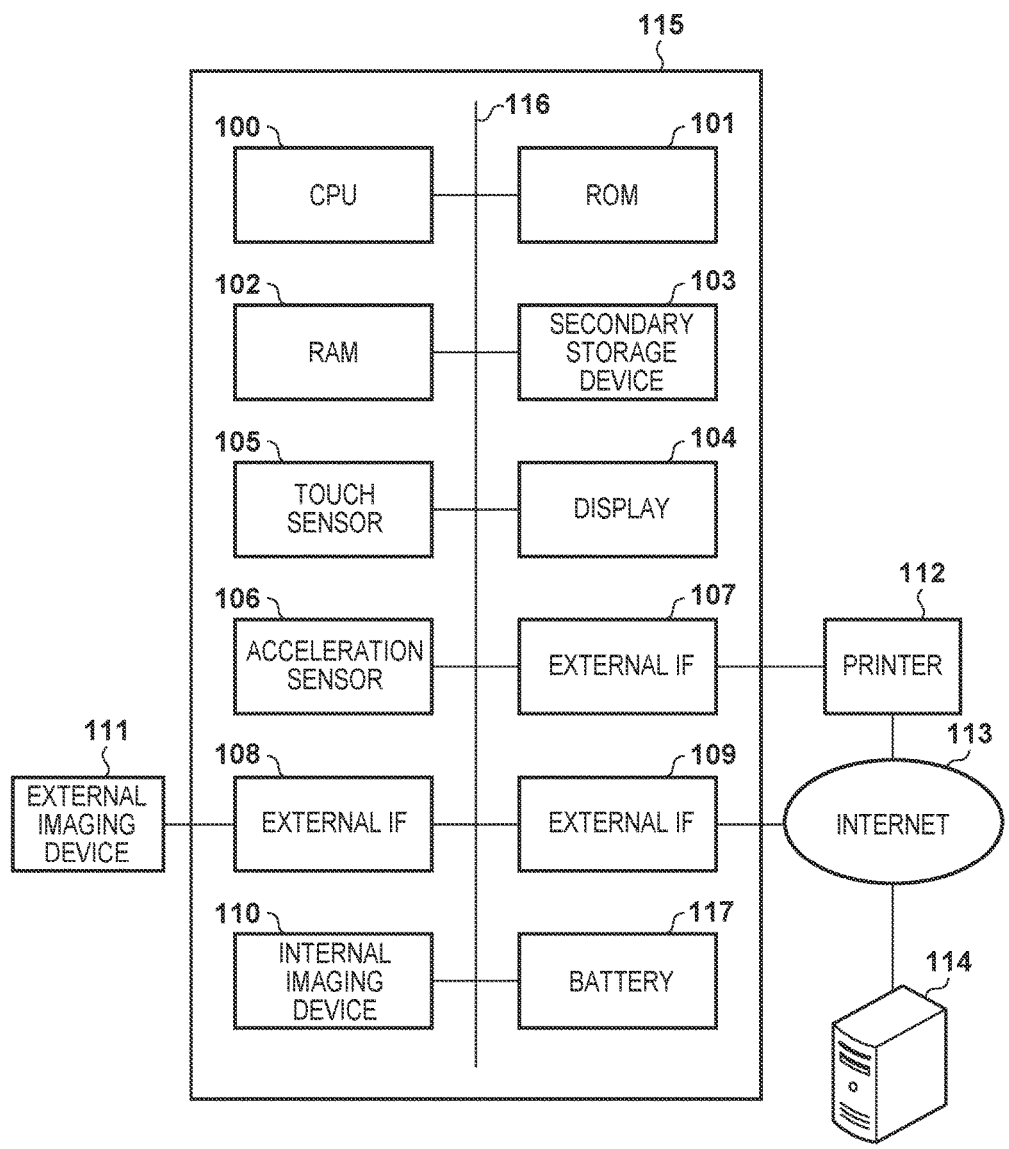
FIG. 1 is a block diagram showing an example of the arrangement of hardware according to the present invention.

FIG. 1 shows an example of the arrangement of a system according to this embodiment. In the system according to this embodiment, an information processing apparatus 115, a printer 112, and a server 114 are connected via a network. The information processing apparatus 115 corresponds to, for example, a portable information terminal such as a smartphone or a portable telephone. Referring to FIG. 1, a CPU (Central Processing Unit/Processor) 100 executes various kinds of processing to be described below in accordance with programs. FIG. 1 shows one CPU 100, though it may include a plurality of CPUs or a CPU core. A ROM 101 stores programs to be executed by the CPU 100. A RAM 102 is a memory configured to temporarily store various kinds of information when the CPU 100 executes the programs.

A secondary storage device 103 is a storage medium such as a hard disk or a flash memory, and stores various kinds of programs and data such as a database for holding files and results of processing such as image analysis. A display 104 displays a UI (User Interface) configured to accept operations for implementing various kinds of processing or various kinds of information such as a processing result obtained by executed processing. The display 104 may include a touch sensor 105.

An internal imaging device 110 performs imaging. Image data obtained by the imaging undergoes predetermined image processing and is then saved in the secondary storage device 103. Image data may be loaded from an external imaging device 111 connected to an external IF (interface) 108.

An external IF (interface) 109 can communicate with an external device via a network such as the Internet 113. An acceleration sensor 106 can obtain acceleration information concerning the position and orientation of the information processing apparatus 115 itself.

Each of external IFs 107 to 109 is an interface having at least one communication form of wire communication and wireless communication, and communicates with an external device (the printer 112 or the server 114) in accordance with the communication form in use. The information processing apparatus 115 can obtain image data from the server 114 connected to the Internet 113 or output image data or the like to the printer 112 via the external IFs 107 to 109. Examples of the wire communication are USB and Ethernet®. Examples of the wireless communication are wireless LAN, NFC (Near Field Communication), Bluetooth®, and infrared communication.

Power necessary for the operation of the information processing apparatus 115 is supplied from a battery 117. Various kinds of constituent elements provided in the information processing apparatus 115 are connected to each other via an internal bus 116. The CPU 100 controls the various kinds of constituent elements via the internal bus 116. Note that in this embodiment, the information processing apparatus 115 is the execution place (software execution environment) of software such as a program to be executed by the control unit (CPU 100) provided in the information processing apparatus 115.

Note that the printer will be described here as an example of the external device. However, the present invention is not limited to this, and the external device may be another image forming apparatus such as an MFP (Multi-Function Peripheral) or a communication apparatus such as a FAX apparatus.

[Software Configuration]

Figure 2:
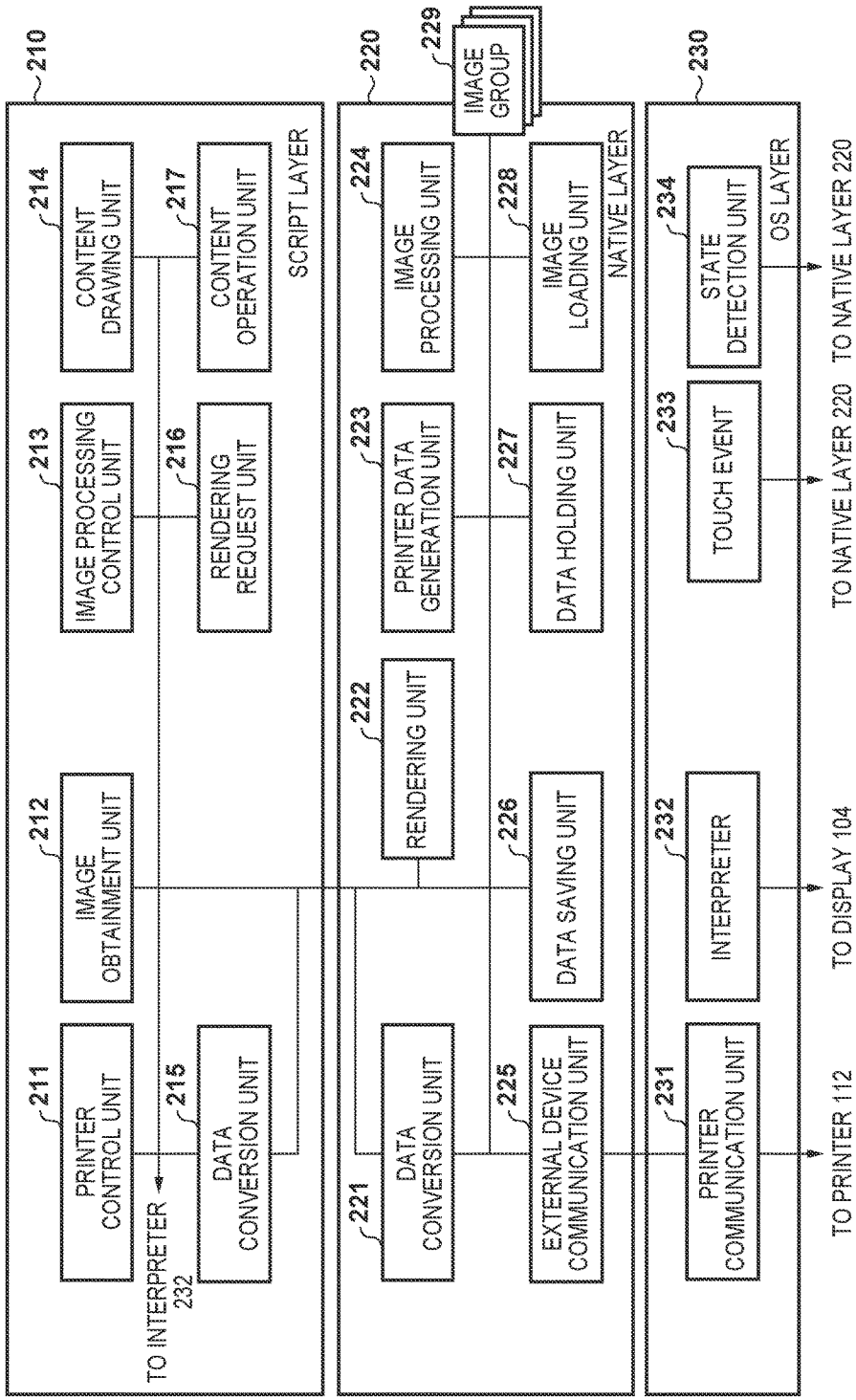
FIG. 2 is a block diagram showing an example of the configuration of software according to the present invention.

FIG. 2 shows an example of the configuration of software that operates on the information processing apparatus 115. The information processing apparatus 115 executes programs of a script layer 210, a native layer 220, and an OS layer 230. These layers are implemented when the CPU 100 reads out and executes corresponding programs stored in the ROM 101 or the secondary storage device 103.

The script layer 210 is a program layer in which instruction sets (for example, content drawing, image display, and moving image reproduction) are described by text data using a web standard language such as HTML5, CSS3, or JavaScript®. In the script layer 210, various kinds of instruction sets of text data are translated and executed on an application execution environment using a processor (for example, the CPU 100) that exists in the application execution environment. As the execution form, a case in which a statement is dynamically translated row by row at each time of execution, a case in which translation is performed upon activating the application, or a case in which translation is performed when the application is installed in the information processing apparatus 115 can be considered.

Processing in the script layer 210 or its contents will be referred to as script hereinafter. As an example of the form in which an instruction is translated in the information processing apparatus 115, the function of an interpreter provided in the native layer 220 or the OS layer 230 is used. In this embodiment, most UIs of the application are assumed to be described by a script.

The native layer 220 is a program layer in which instruction sets translated (compiled) in advance outside the application execution environment are described. As for its form, codes described in a high-level language such as C or C++ are compiled in advance on a PC or server of the application developer and form an aggregate of instructions interpretable by the CPU 100. Processing in the native layer 220 and its contents, including calling the functions of the OS layer 230 from the native layer 220, will be referred to as native hereinafter. Note that another implementation system of the native layer 220 is Java®. Java® is a high-level language similar to C/C++, and is translated into an intermediate code in advance on the development environment at the time of application development. The translated intermediate code operates on a Java virtual environment provided in each OS. In this embodiment, such a program form is also included in a kind of native layer 220.

The OS layer 230 corresponds to the OS (Operating System) provided in the information processing apparatus 115. The OS layer 230 has a function of providing use of the hardware function to the application and unique functions. The OS layer 230 includes an API (Application Programming Interface), and the functions of the OS layer 230 can be used from the script layer 210 or the native layer 220.

In this embodiment, allowing the script layer 210 to call the native layer 220 will be referred to as binding or bind. Various kinds of functions of the native can be used by providing the API and calling the API by the script. This binding function is normally provided in various kinds of OSs as a standard. In this embodiment, an application including the script layer 210 and the native layer 220 is called a hybrid application.

An image obtainment unit 212 of the script layer 210 requests the native layer 220 to obtain image data. As the request of the image obtainment unit 212, for example, a method of designating the path of an image or a method of prompting display to a dialogue is used.

An image loading unit 228 of the native layer 220 obtains image data from an image data group 229. The method of obtaining image data from the image data group 229 depends on the request from the image obtainment unit 212 of the script layer 210. As the request method, a method of selecting an image from a dialogue box provided on an UI or a method of selecting an image directly from the path of the image is used. At the time of image loading, a unique ID is assigned to the image. When an image in the native layer 220 is designated from the script layer 210, the assigned ID is used.

A data conversion unit 221 of the native layer 220 converts data (for example, image data or a parameter in a binary format) in the native layer 220 into data in a format (for example, image data in a text format (BASE64) or JSON format) usable in the script layer 210. The data conversion unit 221 also converts data (for example, image data in a text format (BASE64) or JSON format) sent from the script layer 210 into data (for example, image data or a parameter in a binary format) in a format usable in the native layer 220.

A data conversion unit 215 of the script layer 210 converts data (for example, a processing parameter in a text format) in the script layer 210 into data in a format (for example, a processing parameter in a text format (JSON format)) usable in the native layer 220.

A data holding unit 227 of the native layer 220 holds image data loaded by the image loading unit 228, image data that has undergone image processing by an image processing unit 224, and divided image groups. Each held image data is, for example, rasterized to RGB image data and has a format that enables execution of image processing immediately.

A content drawing unit 214 of the script layer 210 describes a content for print using a web standard language. A script operated by a content operation unit 217 is reflected on the description. The script of the content described by the content drawing unit 214 is interpreted by an interpreter 232 of the OS layer 230 and displayed on the display 104.

An image processing control unit 213 of the script layer 210 decides a correction parameter to be used for image processing and a processing target image, and requests the image processing unit 224 of the native layer 220 to execute image processing. The correction parameter is converted by the data conversion unit 215 into a format that can be sent to the native layer 220 and then sent to the native layer 220 together with the ID of the processing target image.

The image processing unit 224 of the native layer 220 performs image processing for the image designated by the image processing control unit 213 of the script layer 210. At this time, what kind of image processing should be performed is decided by the parameter set by the image processing control unit 213. As for the designation of the image, a method of receiving the path of the image from the script layer 210, a method of receiving whole image data, and the like may be used in addition to the above-described method using an ID.

A touch event 233 of the OS layer 230 obtains information about a touch on the display 104. Examples of the information about a touch are touch detection on the display 104 and touched position information. The obtained information about a touch is sent to the content operation unit 217 of the script layer 210 via the native layer 220.

For example, if image data is returned from the native layer 220 as a response to the image obtainment request, the content operation unit 217 of the script layer 210 changes the script instruction to reflect the image data.

A printer control unit 211 of the script layer 210 controls a request of printer detection, display of a printer setting screen, and generation and sending of print information. On the printer setting screen, printer settings such as a paper size, paper type, and color/monochrome print are done. Based on the items set here, a printer data generation unit 223 of the native layer 220 generates printer data.

The printer data generation unit 223 of the native layer 220 generates data and a command necessary for printer communication based on a request from the printer control unit 211 of the script layer 210. The data necessary for printer communication is data complying with a communication protocol. The command is data used to decide the operation of the printer such as print and scan. Hence, the printer data generation unit 223 generates printer data including the command used to decide the operation of the printer.

An external device communication unit 225 of the native layer 220 is an interface configured to communicate with an external device such as a printer connected to the information processing apparatus 115. The external device communication unit 225 sends data received from the printer data generation unit 223, or receives information from the external device. In this embodiment, communication is done via a printer communication unit 231 of the OS layer 230. However, the external device communication unit 225 of the native layer 220 may directly send data to the external IF 107. If the printer communication unit 231 of the OS layer 230 supports the communication protocol used by the external device, its function can be used. On the other hand, if the printer communication unit 231 does not support the communication protocol used by the external device, the external device communication unit 225 of the native layer 220 performs communication in accordance with the communication protocol.

The interpreter 232 of the OS layer 230 interprets/executes an instruction described in the web standard language and generated by the script layer 210. For example, an instruction to draw an image is executed via the interpreter 232 and displayed on the display 104.

The image data group 229 is an area where image data are held. A data saving unit 226 saves image data held by the data holding unit 227 in the image data group 229 as needed.

A rendering request unit 216 of the script layer 210 requests a rendering unit 222 of the native layer 220 to perform rendering. At this time, contents described by the content drawing unit 214 of the script layer 210 are converted by the data conversion unit 215 and then transferred to the rendering unit 222. If processing is needed before the transfer to the rendering unit 222, the content description may be edited using the content operation unit 217. If direct editing of the content description influences the UI, a copy of the content description may be created and used for the above-described operation.

The rendering unit 222 performs rendering to generate, from the contents received from the rendering request unit 216 of the script layer 210, image data (rendering image) to be sent to the printer 112. The rendering includes, for example, generating an image having an output resolution to the printer 112 by the script layer 210. Note that the rendering result in the native layer 220 and an image halfway through generation are not displayed on the display 104.

A state detection unit 234 of the OS layer 230 detects the state of a device (here, the information processing apparatus 115) in use. For example, if there is another notification such as an incoming call in a state in which an application is used, generation of the event or the state change is sent to the native layer 220.

[Processing Procedure]

FIG. 3 is a flowchart showing processing according to this embodiment, including a user operation. First, the outline of each processing will be described with reference to FIG. 3. Details of each processing will be described later with reference to FIGS. 4 to 8. Note that the processing of each step in the flowchart of the present application is implemented when the CPU 100 of the information processing apparatus 115 executes a program stored in the ROM 101 or the secondary storage device 103. Each step shown in FIG. 3 transits in accordance with a user operation on an application screen 900 shown in FIGS. 9A and 9B, which is one of UIs. The application screen 900 is generated by the script layer 210. An operation on the application screen 900 is implemented via, for example, the touch sensor 105.

In step S31, upon detecting a user operation (including a touch operation input, and ditto) on a photo image selection button 901 of the application screen 900, the CPU 100 selects an arbitrary image in accordance with the operation. When the user selects an image, the CPU 100 executes specific processing in the native layer 220 and then displays the selected image in a drawing region 906 of the application screen 900.

In step S32, upon detecting a user operation on a slide bar 902 configured to adjust the brightness of a displayed image, the CPU 100 sets a correction parameter to be used in image processing in accordance with the operation. Note that in FIGS. 9A and 9B, adjustment may be accepted for an item different from the brightness provided with the slide bar configured to adjust the brightness. For example, the UI shown in FIGS. 9A and 9B may accept adjustment of a density, resolution, or the like. In response to an execution instruction, the CPU 100 performs image processing for the displayed image and performs specific processing in accordance with the set correction parameter. After that, the CPU 100 displays the processing contents and the processing result in the drawing region 906.

In step S33, upon detecting a user operation on a stamp addition button 903, the CPU 100 displays stamps. Upon detecting stamp selection by a user operation on the stamp list, the CPU 100 adds/displays the selected stamp in the drawing region 906. In addition, enlargement/reduction or movement of the stamp can be implemented by detecting a touch event (tap or swipe) on the stamp. This detection function is included in the web standard language a standard function. For example, an addEventListener function corresponds to the function.

In step S34, upon detecting a user operation on a print button 905, the CPU 100 displays a setting screen 911 (FIG. 9B) used to set information necessary for print. Examples of information necessary for print are the setting items of a paper size, paper type, print quality, and bordered/borderless print, as shown in the setting screen 911 of FIG. 9B. In addition, setting items such as double-sided/single-sided print and color/monochrome print, which are settable in accordance with the functions of the printer to be used, are constituted.

In step S35, upon detecting a user operation on a setting completion button 912 of the setting screen 911, the CPU 100 executes rendering to convert the image displayed in the drawing region 906 into data to be output to the printer 112. According to the user operation on the setting completion button 912, the set contents designated on the setting screen 911 are reflected, and the setting screen 911 is closed.

After the data is created by rendering, the CPU 100 sends the created data for print as printer data to the printer 112 together with a printer control command. With the above-described processing, the image selected by the user is printed by the printer 112.

Note that the processes shown in FIG. 3 are examples of functions provided by the photo print application. The processing contents are not limited to these, and the processing order is not limited to this. In this embodiment, a first program layer including an instruction set to be translated and executed by the processor is defined as the script layer 210, and a second program layer including an instruction set to be translated in advance by a device other than the processor and executed by the processor is defined as the native layer 220. A program including the first program layer and the second program layer implements a hybrid application.

Details of each processing shown in FIG. 3 will be described next. As described above, each processing is implemented when the CPU 100 of the information processing apparatus 115 executes a program stored in the ROM 101 or the secondary storage device 103. A description will be made here while clarifying which one of the program of the hybrid application (the script layer and the native layer) and the program of the OS (the OS layer) executes each processing step.

[Details of Photo Image Selection Processing]

Photo image selection and associated image processing will be explained. When the user presses the photo image selection button 901 shown in FIG. 9A, step S31 starts. Details of the photo image selection of step S31 in FIG. 3 will be described with reference to FIG. 4. Referring to FIG. 4, steps S401 and S411 are processes executed by the CPU 100 using the program of the script layer 210, and steps S402 to S410 are processes executed by the CPU 100 using the program of the native layer 220.

In step S401, the script layer 210 requests the native layer 220 to select an image in accordance with a user operation on the photo image selection button 901. In this request, an image selection API unique to the native layer 220 is directly called from the script layer 210 by the binding function. Note that if the image selection API unique to the native layer 220 cannot directly be called, a function capable of being directly called from the script layer 210 is prepared in the native layer 220, and a function of directly calling the image selection API unique to the native layer 220 is described in the function. This is a method of preparing a wrapper in advance. Alternatively, an arrangement that independently implements an image selection UI may be used.

In step S402, the native layer 220 displays the image selection UI on the display 104. The native layer 220 selects one arbitrary image based on a user operation on the displayed image selection UI. Note that in this embodiment, one image is selected from an image folder in the device. However, the present invention is not limited to this. For example, an image on the Internet or an image in a detachable storage medium may be selected. An image may be shot on the spot using the camera function of the device and selected.

In step S403, the native layer 220 generates identification information (ID) used to uniquely identify the selected image. This ID can have any format such as a numerical value or a character string as long as it can be sent from the native layer 220 to the script layer 210. Note that the ID need not always be generated in the native layer 220 and may be generated in the script layer 210 and sent to the native layer 220.

In step S404, the native layer 220 obtains the selected image. For example, if the selected image is in the state of an image file, the native layer 220 opens the file and reads the contents.

In step S405, the native layer 220 rasterizes the obtained image in an RGB space. Here, RGB data are held in the native layer 220. However, the present invention is not limited to this. For example, the data may be held in the JPEG (Joint Photography Expert Group), PNG (Portable Network Graphics), or RGBA format. The RGBA format combines A that is a degree of transparency with the RGB (red, green, and blue) components of image data.

In step S406, the native layer 220 divides the rasterized RGB data to create RGB data of each divided region. The RGB data of each divided region will be referred to as a "block image". Such a block image is generated to avoid an image size limitation. As described above, in a hybrid application, when displaying an SVG content in which an image is laid out using a function of a web, the image size may be limited to perform high-speed display. For this reason, when printing a content including a high-resolution image by a hybrid application, the quality of the printed product decreases because of the image size limitation. More specifically, the resolution is changed to make the image size fall within the limited size. In this embodiment, division to block images is performed to avoid this. A block image can have either a tile shape or a strip shape. The tile shape represents that both the width and height of a block image are smaller than those of the division source data. The strip shape represents that only one of the width and height of a block image is smaller than that of the division source data.

FIG. 10 shows examples of division patterns to block images. Referring to FIG. 10, the original image is assumed to be an image of 12,000,000 pixels corresponding to 4000 px×3000 px. FIG. 10 shows two examples (equivalent division and upper limit division) in which the original image is divided into three strip-shaped block images and two examples (equivalent division and upper limit division) in which the original image is divided into four tile-shaped block images. Equivalent division is a division method of dividing the original image into block images in the same size. Upper limit division is a method of dividing the original image into block images each having a size smaller than a predetermined upper limit value.

As the advantage of division to strip-shaped block images, processing is relatively easy. Additionally, in a case in which rendering is performed for a print content divided into bands, if an image exists at the boundary of the bands, the number of images to be used in rendering can be decreased by dividing the image into strip-shaped block images in the horizontal direction. On the other hand, the tile shape can be used when the width or height is smaller than the number X of pixels for division. For example, when dividing an image having a width of 3000 px into minimum images each having a width of 1500 px, the image needs to be divided into tile-shaped block images.

More specifically, as shown in FIG. 10, when dividing an image into strip-shaped blocks, equivalent division of dividing the image into three images each having 4,000,000 pixels or upper limit division of dividing the image into three images respectively having 5,000,000 pixels, 5,000,000 pixels, and 2,000,000 pixels can be used. As the advantage of the equivalent division, if the division number is fixed, the usage of the memory can be minimized. On the other hand, the upper limit division has the advantage of minimizing the division number. Alternatively, if the number of pixels is large, a method of deciding conditions by repeating the equivalent division of the image until the number of pixels decreases to 5,000,000 or less can be considered. For example, 12,000,000 pixels are divided into 2 images×6,000,000 pixels, and further divided into 4 images×3,000,000 pixels. The division conditions can be decided based on the same concept even for tile-shaped block images.

Figure 12:
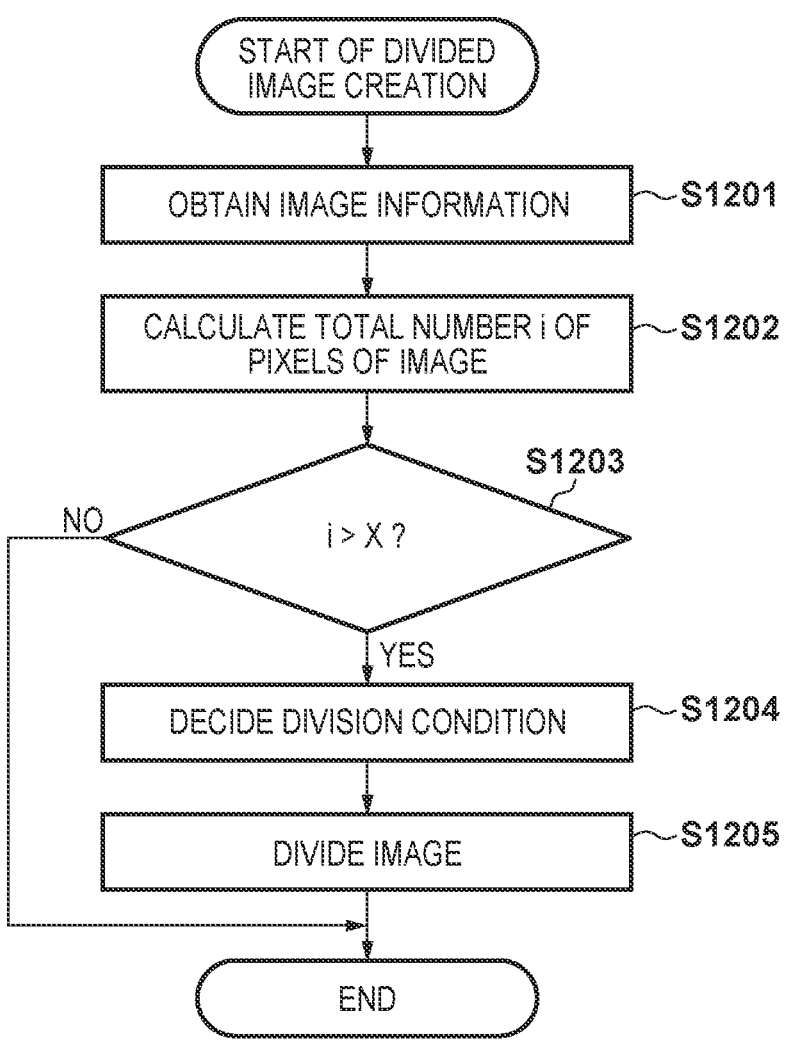
FIG. 12 is a flowchart of divided image creation processing according to the present invention.

Details of the processing of creating divided images in step S406 will be described here with reference to FIG. 12. This processing is performed by, for example, the image processing unit 224 of the native layer 220.

In step S1201, the native layer 220 obtains image information. In this embodiment, the conditions of division to block images are decided from image information to be laid out in a content. The image information includes the number (W) of pixels (px) in the vertical direction and the number (H) of pixels in the horizontal direction. These pieces of information can easily be obtained at the time of image loading. For example, if the original image before rasterization is a JPEG image, the information can be obtained from EXIF information.

In step S1202, the native layer 220 calculates the total number i of pixels of the image from the obtained image information. The total number i of pixels can be obtained by i=W×H. For example, as indicated by the example of the original image in FIG. 10, if the number of pixels of the image is W=4000 px×H=3000 px, i=4000×3000=12,000,000 pixels.

In step S1203, the native layer 220 determines whether the total number i of pixels is larger than a predetermined value X (for example, 5,000,000 pixels). If the total number i of pixels is larger than the predetermined value X (YES in step S1203), the process advances to step S1204. If the total number i of pixels is not larger than the predetermined value X (NO in step S1203), the divided image creation processing ends without creating divided images. The predetermined value X is decided based on the memory size of the information processing apparatus 115, the upper limit value in the OS, or the like.

In step S1204, the native layer 220 decides a division condition. If the total number i of pixels of the image is 12,000,000 pixels, a condition to divide the image into block images within the range of X is decided. In this embodiment, the division condition can be any condition within the range of X. For example, as described above, a condition to divide the image into a predetermined number of block images or a condition to divide the image such that the number of pixels of one block image becomes less than a predetermined number of pixels can be set. Note that in this embodiment, the division condition is decided by the native layer 220. However, the division condition may be decided by the script layer 210 based on the obtained image information.

In step S1205, the native layer 220 divides the image in accordance with the division condition decided in step S1204. This processing procedure thus ends.

An explanation will be made below assuming that the original image has 6,000,000 pixels, and the image is divided to generate two strip-shaped block images each having 3,000,000 pixels. The description will be given referring back to FIG. 4.

In step S407, the native layer 220 holds the rasterized RGB data and the generated block image group in the data holding unit 227 in association with the ID generated in step S403. For example, a method is usable which creates an object including the ID and the RGB data or the block image group, thereby making it possible to specify the RGB data or the block image group from the ID. The ID associating method is not limited to this, and any method is usable if the RGB data and the block image group can be specified from the ID.

The RGB data and the block image group may be held on a memory or saved as a file. Assume here that the block image group is converted into a DIB (Device Independent Bitmap) format that can easily be used by the script layer 210 and saved in a file. In this case, association with the ID can be implemented by adding the ID to decided names like "block1_ID.bmp" or "block2_ID.bmp". An image format other than DIB may be used.

In step S408, the native layer 220 creates, from the RGB data, reduced RGB data to be used in a UI. The image reduction processing may be performed using the function of the OS or by an implementation specific to the application. If the returned image is large, the script reduces the image based on the size of the UI and the resolution of the display. If the script handles an image of an excessive number of pixels relative to the UI, a processing load is applied to the CPU, and a large memory capacity is needed, resulting in a waste. Hence, in this embodiment, reduction processing is executed in step S408 to avoid the waste. As the guideline of the reduction processing, for example, the display size of the display or the size of a portion to display an image is set to the upper limit, and the reduction processing is performed for an image whose number of pixels exceeds the upper limit. Even when performing image processing for the image, image processing is performed for the original image (image data rasterized to RGB data). After execution of the reduction processing, the reduced image is transferred to the script layer.

In step S409, the native layer 220 converts the reduced RGB data created in step S408 into image data of a format usable (format supportable) in the script layer 210. In this embodiment, the converted data format is the JPEG format.

In step S410, the native layer 220 converts the data of the JPEG format into BASE64 data, and sends it to the script layer 210 together with the generated ID. This is because the format of the JPEG data handled in the native layer 220 cannot directly be used in the script layer 210. BASE64 is an encoding method used to handle binary data as character string data, and is a data format usable in JavaScript®. Note that as the method of handling an image in the script layer 210, a method of temporarily saving JPEG data in a file in the native layer 220 and using the saving path may be used.

In step S411, the script layer 210 receives the BASE64 data converted by the native layer 220 and draws an image in the drawing region. More specifically, the script layer 210 sends the designated BASE64 data to the interpreter 232 of the OS layer 230. The interpreter 232 interprets the script of the BASE64 data and displays it as an image in the drawing region. FIG. 14A shows an example of a sample code that reflects the BASE64 data.

Figure 9A:
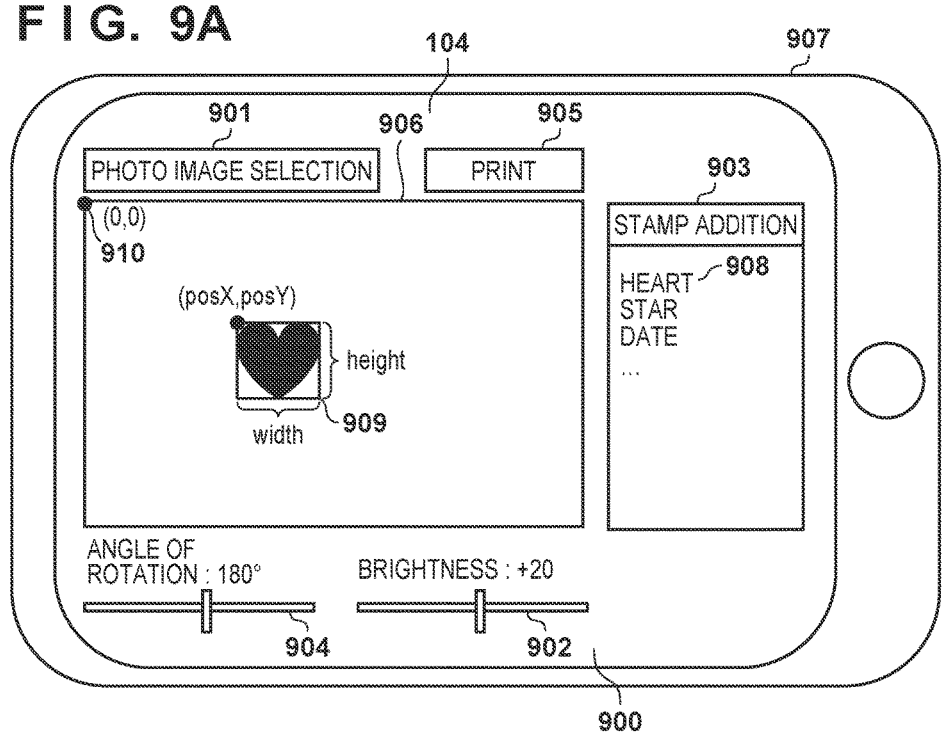
FIGS. 9A and 9B are views showing examples of screens according to the present invention.

The example shown in FIG. 14A represents a method of dynamically adding, by SVG, the data to the drawing region 906 shown in FIG. 9A. A stamp to be described later can also be added to the drawing region 906 by the same operation.

[Details of Image Processing]

Step S32 starts when the user operates the slide bar 902 shown in FIG. 9A. Details of image processing of step S32 in FIG. 3 will be described with reference to FIG. 5. Referring to FIG. 5, steps S501 to S503, S510, and S512 are processes executed by the CPU 100 using the program of the script layer 210, and steps S504 to S507 and S509 are processes executed by the CPU 100 using the program of the native layer 220. Assume here that image processing of changing the brightness of an image is executed, and the set value of the slide bar 902 operated by the user is used as the degree of change.

In step S501, the script layer 210 sets a correction parameter. As the correction parameter, the value of the slide bar 902 is used.

In step S502, the script layer 210 activates an indicator and displays it on the display 104. The indicator is a display to notify the user that processing is in progress, and a progress bar, a clock mark, rotation of a graphic, or the like is used. The indicator is displayed when, for example, processing that takes a long execution time is performed. In this embodiment, the script layer 210 activates and stops the indicator. However, the native layer 220 can also use the indicator.

In step S503, the script layer 210 sends the correction parameter set in step S501 and the ID (the ID of the image generated in step S403) of the image to execute image processing to the native layer 220 in the JSON format. Note that JSON is JavaScript Object Notation which is a data notation method usable in JavaScript®. JSON is one of data formats sendable/receivable to/from the native layer 220. For example, FIG. 14B shows a description example of a program code for sending an ID and a value of brightness correction.

In step S504, the native layer 220 specifies the RGB image rasterized in step S405 of FIG. 4 based on the ID obtained from the script layer 210.

In step S505, the native layer 220 executes brightness correction for the RGB image based on the obtained correction parameter. In this embodiment, based on a value "+20" set on the slide bar 902, processing of adding 20 to the RGB values of all pixels is performed. As for the image processing, image processing to be executed may be increased in number by adding another image processing information to the correction parameter. For example, known monochrome conversion, known sepia conversion, "ImageFix", "RedeyeFix", "SmartSkin", and the like can be added.

"ImageFix" is a function (face detection function) of automatically analyzing a photo image using personal face detection or a scene analysis unit and performing appropriate brightness/white balance adjustment. "RedeyeFix" is a function (red-eye detection function) of automatically detecting a red-eye image from an image and correcting it. "SmartSkin" is a function of detecting a personal face from a photo image and appropriately processing the skin region of the face. Note that the types of image processing functions are not limited to these, and various kinds of image processing may be used in accordance with the application purpose or aim. In addition, the image processing may be done using a function provided by the OS layer 230.

In step S506, the native layer 220 creates a block image group by the same processing as in step S406 from the RGB image that has undergone the image processing in step S505. Here, the block image group associated with the ID in step S407 is replaced with the block image group created in step S506, and the block image group created in step S406 is discarded.

In step S507, the native layer 220 creates, from the RGB image that has undergone the image processing in step S505, a reduced RGB image to be used in a UI.

In step S508, the native layer 220 converts the reduced RGB image created in step S507 into image data of a format usable (format supportable) in the script layer 210. Here, the reduced RGB image is converted into data of the JPEG format, as in step S409.

In step S509, the native layer 220 requests the script layer 210 to stop the indictor. This is implemented by calling a function of indicator stop defined in the script layer 210 from the native layer 220.

In step S510, the script layer 210 stops the indicator based on the request from the native layer 220, and erases the indicator from the display on the display 104.

On the other hand, in step S511, the native layer 220 converts the converted data of the JPEG format into BASE64 data and sends it to the script layer 210.

In step S512, the script layer 210 receives the BASE64 data converted by the native layer 220 and according to the BASE64 data, changes the image drawn in step S411. More specifically, the script layer 210 sends the designated BASE64 data to the interpreter 232 of the OS layer 230. The interpreter 232 interprets the script of the BASE64 data and displays the image data drawing result in the already existing drawing region. Image data to which image processing based on the correction parameter is applied is thus displayed.

In this embodiment, image processing is started by a change on the slide bar 902 as shown in FIG. 9A. However, the starting method is not limited to this. For example, a plus button and a minus button may be laid out on the screen so that the brightness is adjusted every time the buttons are pressed. Alternatively, the brightness adjustment may be implemented by processing linked to a touch event so that, for example, the brightness is increased by a touch on the right half of the screen and decreased by a touch on the left half. A method of changing only the correction parameter by a user operation and performing all image processes when an image processing execution instruction is input may be used.

[Stamp Addition]

When the user presses the stamp addition button 903 shown in FIG. 9A and selects a heart stamp 908, the processing of step S33 in FIG. 3 starts. Details of stamp addition of step S33 in FIG. 3 will be described with reference to FIG. 6. In the following description, an example in which a stamp list is displayed by pressing the stamp addition button 903 on the application screen 900 in FIG. 9A by a user operation and, after that, the heart stamp 908 is selected will be described. Note that the stamp addition is processing executed by the CPU 100 using the program of the script layer 210. Assume that the stamp (stamp image) to be used is held in advance as a resource file by the application.

In step S601, the script layer 210 obtains a path on which an image to be used as a stamp is saved. A file defined in advance is loaded as a stamp. Hence, when the user taps on the heart stamp 908, a path on which the heart stamp is saved is returned.

In step S602, the script layer 210 creates a stamp drawing object.

In step S603, the script layer 210 sets the information of the path obtained in step S601 in the created stamp drawing object. The processes of steps S602 and S603 can be implemented by almost the same method as that used to add an image in step S411. Unlike step S411, the information source of the image is not BASE64 image data but the path of the stamp. A touch event may be assigned to the stamp. If a touch event is assigned, information about a touch operation such as tapping on the stamp or swiping can be obtained. When this information is used, an operation of moving the stamp is enlarging/reducing the stamp can be performed.

In step S604, the contents of step S603 are interpreted by the interpreter 232, and the script layer 210 adds the stamp selected by the user operation to the drawing region 906. The processing procedure thus ends.

[Printer Setting]

When the user presses the print button 905 shown in FIG. 9A, the processing of step S34 in FIG. 3 starts. Details of printer setting of step S34 in FIG. 3 will be described with reference to FIG. 7. Referring to FIG. 7, steps S701 and S709 to S711 are processes executed by the CPU 100 using the program of the script layer 210. Steps S702, S704, S705, S707, S708, and S712 are processes executed by the CPU 100 using the program of the native layer 220. Steps S703 and S706 are processes executed by an external device (here, the printer 112).

In step S701, the script layer 210 requests the native layer 220 to obtain printer information as device information. This is requested to perform communication with the printer 112. As the request method, an API unique to the native is called from the script by the binding function, as in image selection. In the native layer 220, a function that can directly be called from the script layer 210 or a so-called wrapper that indirectly calls the function is prepared in advance. For example, a native function GetPrinterInfo is prepared and called from the script side. In this way, the native layer 220 obtains the request of communication with the external device from the script layer 210. Normally, the script layer 210 cannot directly communicate with the external device because of a restriction from the viewpoint of security. Hence, the script layer 210 temporarily requests the native layer 220 to obtain external device information and communicates with the external device via the native layer 220. The native layer 220 has a function of communicating with the external device (for example, the printer 112) via the OS layer 230.

In step S702, if the function is called from the script layer 210, the native layer 220 performs a search for a printer (so-called discovery). For example, a printer connected via the same wireless LAN router is detected. Here, to detect a communicable printer, for example, the native layer 220 attempts to communicate with a printer using a method such as broadcast or multicast by a protocol such as Bonjour®.

In step S703, the printer responds to the request from the information processing apparatus 115 (native layer 220).

In step S704, the native layer 220 detects the IP address of the printer that has responded and stores it.

In step S705, the native layer 220 requests the IP address of the printer that has responded to provide printer information. If there exist a plurality of printers that have responded, the native layer 220 requests all printers to provide information. To do this, the native layer 220 generates a command to obtain the printer information. This command is an instruction to designate the operation of a printer, and is expressed by, for example, XML (Extensible Markup Language) as shown in FIG. 15A.

A numerical value such as "01:" described on the left side of each row shown in FIG. 15A is a row number added for the descriptive convenience, and is not described in an original text of the XML format. This also applies to the following description examples of program codes.

The first row is a header, and represents that the command is described in the XML format. In the second row, cmd represents the start of the command, and xmlns designates a name space and designates the definition of interpretation of the command. In the sixth row, </cmd> represents the end of the command. The third row declares that the contents are described from there, and the fifth row represents the end. In the fourth row, the instruction to request is described, and an actual instruction word exists between <operation> and </operation>. GetInformation that is the instruction word is an instruction to obtain the information of a printer as an external device. For example, the instruction requests providing of capability information such as the type and size of paper supported by the printer, the presence/absence of a borderless print function, and print quality.

Note that the printer information obtainment command may be generated by, for example, loading a fixed text stored in the ROM 101 in advance. The format is not limited to a text format such as XML, and the command may be described in a binary format, and communication may be done by a protocol according to this. The generated printer information obtainment command is sent to the printer via the external device communication unit 225 using a format complying with a communication protocol such as HTTP supported by the printer. The communication method is not limited to this. Connection using Wi-Fi® direct or Bluetooth®, infrared communication, telephone network, wire LAN, or USB may be performed.

FIG. 7 shows an arrangement that generates a command by the native layer 220. However, a command may be generated by the script layer 210. In this case, the script layer 210, for example, creates the command including the statement in the XML format shown in FIG. 15A and transfers to the native layer 220. Upon receiving this, the native layer 220 sends the command to the printer using the format complying with the communication protocol.

In step S706, upon receiving the command from the information processing apparatus 115, the printer sends the printer information that is device information to the information processing apparatus 115 using the XML format in accordance with the communication protocol. FIG. 15B shows a description example of description of printer information.

The first row is a header, and represents that the command is described in the XML format. In the second row, cmd represents the start of the command, and xmlns designates a name space and designates the definition of interpretation of the command. In the 21st row, </cmd> represents the end of the command.

The third row declares that the contents are described from there, and the contents continue up to </contents> in the 20th row. The fourth row represents a device ID. The fourth row represents that the model name of the printer that has sent the printer information is "Printer001". Information described in the fifth row is not used in this embodiment and will be described later in the second embodiment. From the sixth row that sends the printer information, each mode of the printer is described. Information of one mode is described from <mode> to </mode>. In the sixth row, the mode number is 1 (mode=1). After that <media> describes the type of print paper, <size> describes the paper size, <quality> describes print quality, and <border> describes information of bordered/borderless print. In the 11th row, <dpi> represents the input resolution. The resolution in the horizontal direction is 1200 [dpi], and the resolution in the vertical direction is 1200 [dpi]. Details of the input resolution will be described later.

From the 13th row, information of mode (mode=2) that is another mode is described. In this way, the model name of the printer and all modes supported by the printer are described in the XML. Note that the printer information description method is not limited to this, and a text that is not a tag format or another format such as a binary format may be used.

An example in which the information of the print function of the printer is transferred has been described here. However, the present invention is not limited to this. For example, information representing image processing or analysis processing executable by the printer, the presence/absence of a low-noise print mode, the presence/absence of use of a memory card, a status such as a remaining ink amount, or the like may be transferred. Examples of image processing are color conversion such as monochrome conversion, sepia conversion, and chroma enhancement, layout of a plurality of images, white balance correction, noise removal, and processing of automatically correcting a photo to a desired color or brightness.

In step S707, the native layer 220 obtains the printer information from the printer. The native layer 220 obtains, from the received printer information, for example, the items of the paper type and size, print quality, and bordered/borderless print and the number of items in all modes of the printer.

In step S708, the native layer 220 converts the received printer information into a format interpretable by the script layer 210 and sends it to the script layer 210. That is, the native layer 220 transfers the information obtained by the communication with the printer to the script layer 210. More specifically, a native function is provided, and the binding function is used. A method of sending the received printer information in the XML format or a method of converting the printer information into a text format without tags and then sending the information may be used. In addition, every time a specific native function is called from the script layer 210, information may be obtained as a return value. Alternatively, an argument such as a mode to be obtained may be passed to the native function, and information may be obtained as a return value. Otherwise, transfer using a JSON character string described above with reference to FIG. 14B may be performed, or transfer using a character string such as BASE64 may be performed using the data conversion unit 215 of the script layer 210 and the data conversion unit 221 of the native layer 220 may be performed.

In step S709, the script layer 210 generates and displays a setting screen (FIG. 9B) including a function usable by the printer based on the printer information received from the native layer 220. This is also called display control. If there exist a plurality of connectable printers, the script layer 210 generates a display screen that displays printer names and causes the user to select a printer to print before the setting screen 911 is displayed. Using printer information corresponding to the selected printer, the script layer 210 displays the setting screen 911 of the selected printer. Note that printer selection is not limited to the above-described method, and a printer that has responded first, a printer having more functions, or a printer without congestion of print jobs may be selected.

As described above, the script layer 210 displays the setting screen 911 that causes the user to select the type and size of print paper, print quality, and functions such as bordered/borderless print usable by the printer. FIG. 16 shows a description example of the setting screen by HTML.

Referring to FIG. 16, GetPaperSizeNum( ) GetMediaTypeNum( ) GetQualityNum( ) and GetBorderNum( ) are native functions and have a function of obtaining the number of items. For example, if the printer supports four types of paper sizes A4, A5, B5, and L size, GetPaperSizeNum( ) returns "4".

GetPaperSizeT(n), GetMediaTypeT(n), GetQualityT(n), and GetBorderT(n) are native functions, each of which returns a character string corresponding to the value of an argument n as an ordinal number. Here, assume that A4, A5, B5, and L size are sequentially held as paper sizes. In this case, the return value of the function GetPaperSize(0) that returns the text of a paper size is "A4", and the return value of GetPaperSize(1) is "A5". These values are extracted by the native function from the printer information received from the printer.

GetPaperSizeV(n), GetMediaTypeV(n), GetQualityV(n), and GetBorderV(n) are native functions, each of which returns a character string corresponding to the value of the argument n as an ordinal number. Here, assume that glossy paper is held as a paper type. In this case, the return value of the function GetMediaTypeT(n) that returns the text of a paper type is a word like "glossy paper" that is displayed and presented to the user. On the other hand, the return value of GetMediaTypeV(0) is an expression "GlossyPaper" interpretable by the printer. The word or expression is decided by the native in association with the information sent from the printer. For example, if a value extracted from the information sent from the printer is "GlossyPaper", the text to be displayed is decided as "glossy paper". As for the deciding method, the native holds a corresponding table in advance and decides a text in accordance with the corresponding table.

Note that a specification that sets the paper size, paper type, print quality, and bordered/borderless print has been described as an example. However, the present invention is not limited to this. As another example, other setting items such as double-sided/single-sided print, color/monochrome print, and on/off of image correction may be included. Additionally, as described above, not only the print function but also information representing image processing or analysis processing executable by the printer, the presence/absence of a low-noise print mode, the presence/absence of use of a memory card, a status such as a remaining ink amount, or the like may be displayed.

In step S710, the script layer 210 selects a function to be set in the printer based on a user operation on the setting screen 911. An example in which the description example of the HTML format shown in FIG. 16 is displayed on the display 104 using the rendering unit 222 of the native layer 220 is the setting screen 911 shown in FIG. 9B. Printer information is requested via the native layer 220, and the setting screen 911 is formed based on information obtained from the printer information using the above-described native functions. Note that the HTML can be formed by either the script layer 210 or the native layer 220.

Figure 9B:
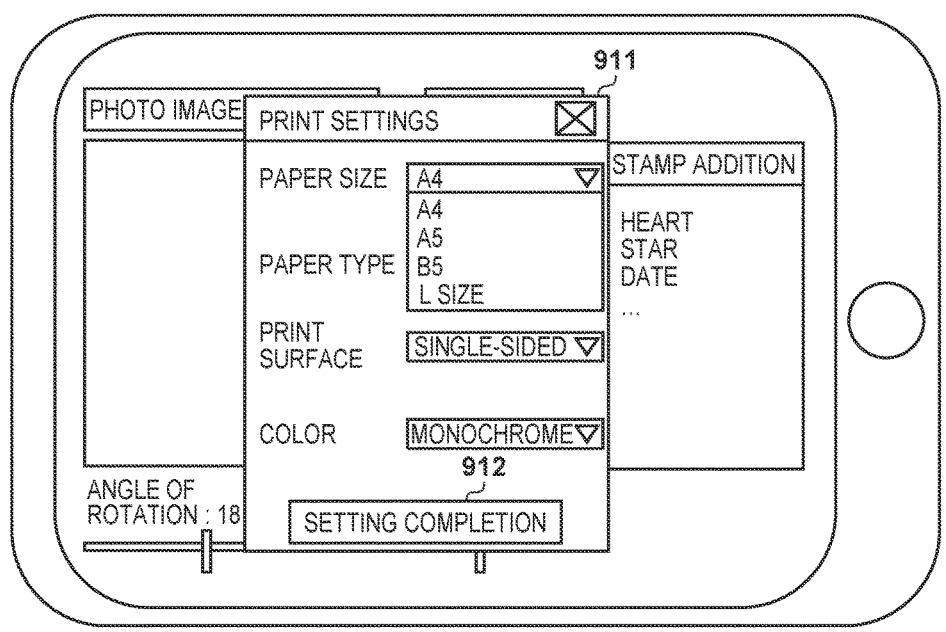

Each setting item such as the paper size shown in FIG. 9B uses a pull-down menu, and an item can be selected by a user operation. The setting screen 911 shows a state in which a list of items selectable as the setting items of the paper size is displayed by a pull-down menu. A paper size such as A4 or A5 can be selected by a user operation.

In step S711, upon detecting a user operation on the setting completion button 912, the script layer 210 creates setting information including setting items selected by user operations and sends it to the native layer 220. SetPrint( ) in the description example of FIG. 16 is a native function with the binding function. In the example shown in FIG. 16, using SetPrint( ) the settings of the paper size, paper type, print quality, and bordered/borderless print are transferred to the native layer 220 as character strings.

In step S712, the native layer 220 receives the setting information from the script layer 210 by the binding function. Later, the native layer 220 generates a print command based on the received setting information in accordance with the communication protocol of the printer 112. The print command is sent to the selected printer via the printer communication unit 231. The processing procedure thus ends.

[Rendering & Print Processing]

Figure 8A:
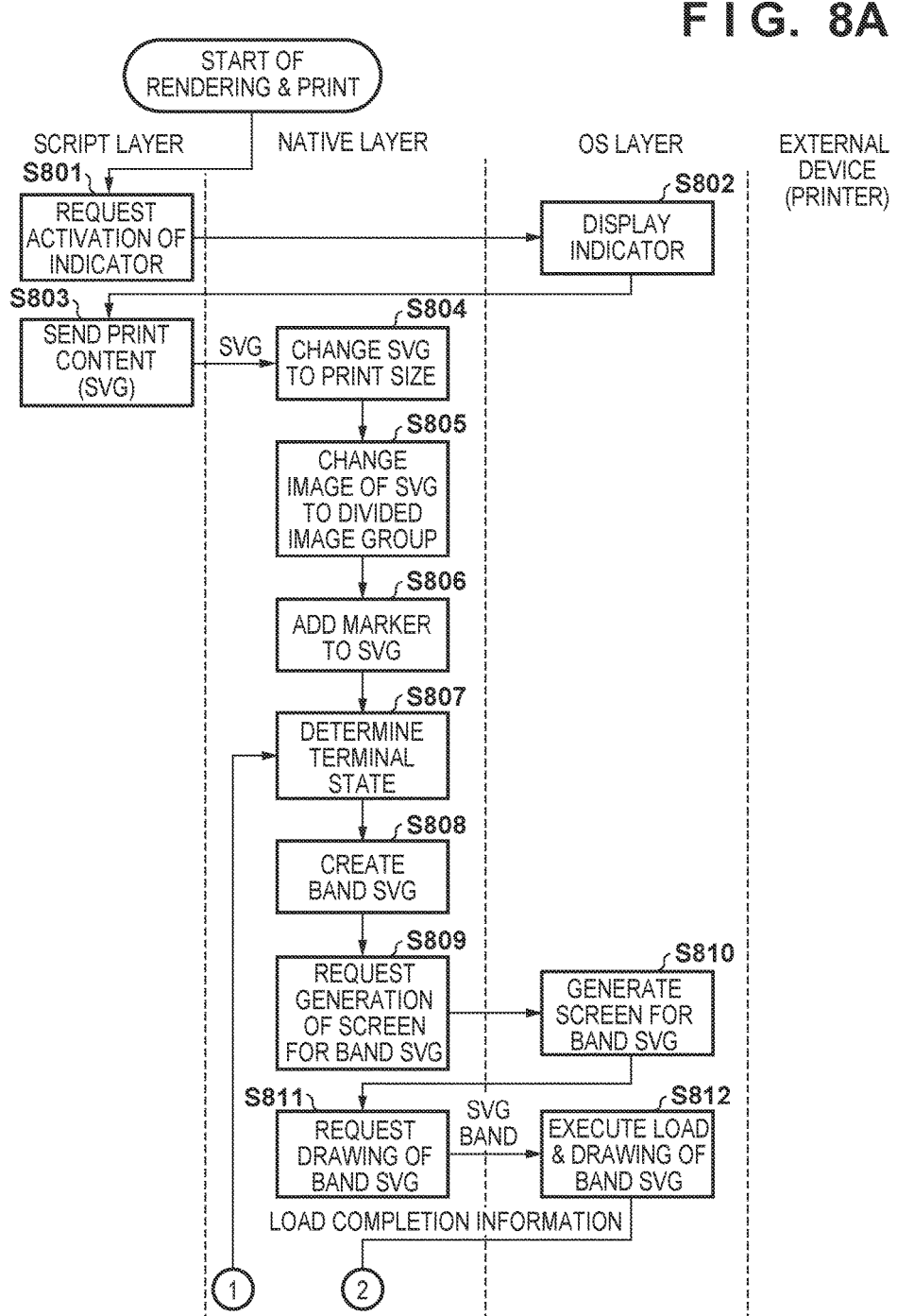
FIGS. 8A and 8B are flowcharts of rendering & print processing according to the present invention.
Figure 8B:
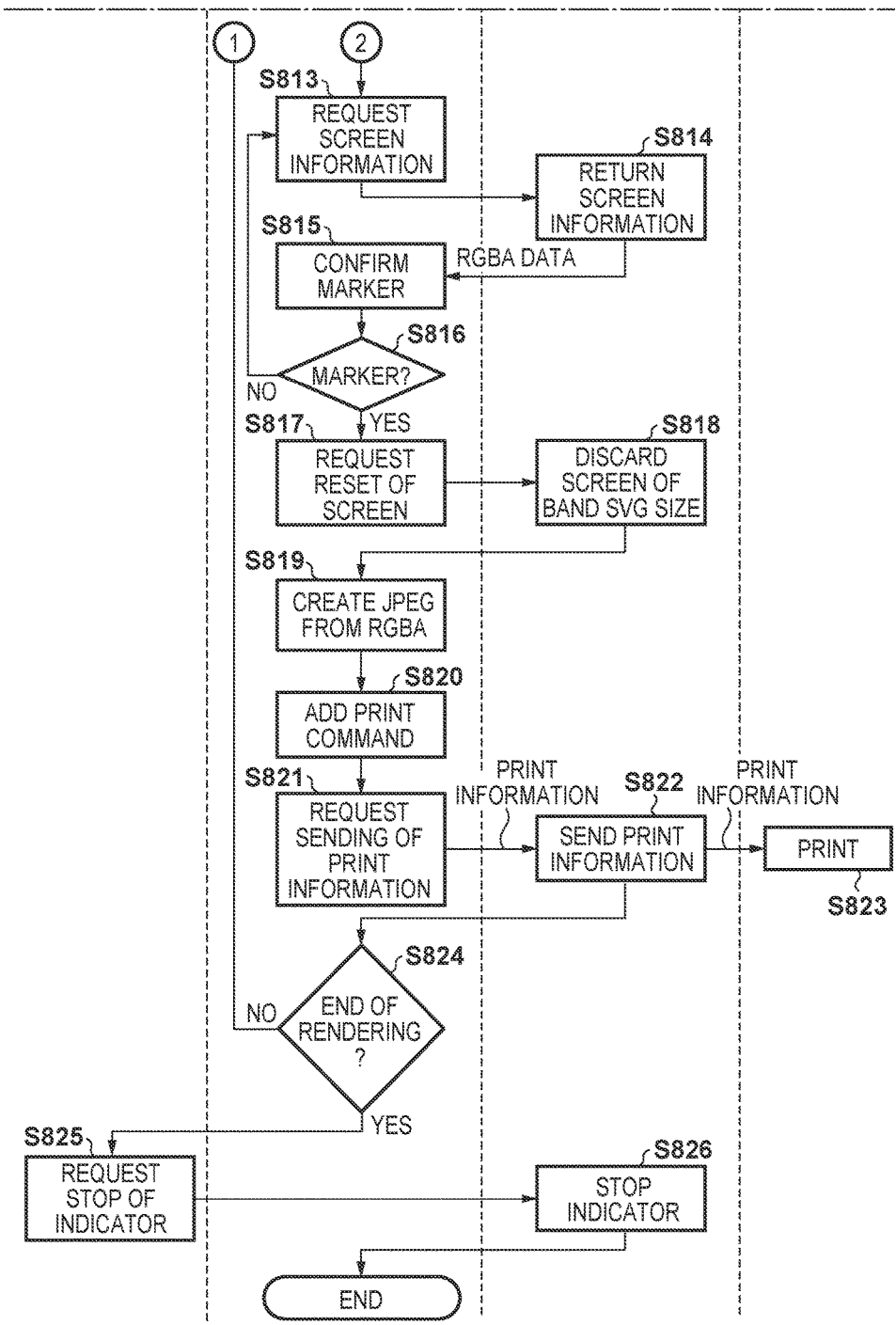

When the user presses the setting completion button 912 of the setting screen 911 shown in FIG. 9B, the rendering & print processing of step S35 in FIG. 3 starts. Details of rendering & print of step S35 in FIG. 3 will be described with reference to FIGS. 8A and 8B. As for the rendering & print processing, assume that a description is made such that the processing is continued even when the application executes processing on the background. For example, in iOS®, beginBackgroundTaskWithExpirationHandler or the like is used. In Android®, a function such as Service that enables an operation even on the background is used. Referring to FIGS. 8A and 8B, steps S801, S802, and S825 are processes executed by the CPU 100 using the program of the script layer 210. Steps S804 to S809, S811, S813, S815 to S817, S819 to S821, and S824 are processes executed by the CPU 100 using the program of the native layer 220. Steps S802, S810, S812, S814, S818, S822, and S826 are processes executed by the CPU 100 using the program (OS) of the OS layer 230. Step S823 is a process executed by an external device (here, the printer 112).

In step S801, the script layer 210 sends an indicator activation request to the OS layer 230.

In step S802, the OS layer 230 displays an indicator based on the request from the script layer 210.

In step S803, the script layer 210 sends an SVG used for UI display to the native layer 220. Note that the operations executable by the script layer 210 as in steps S804 to S806 may be executed by the script layer 210. In this embodiment, an SVG including one photo and one stamp is used as an example. FIG. 17A shows a description example of SVG in a case in which one photo and one stamp are included. Rendering will be described below based on the description example of SVG shown in FIG. 17A. However, the description example of SVG in FIG. 17A merely explains an outline, and a description of detailed settings is omitted.

In step S804, the native layer 220 obtains, from print information, an output resolution to be sent to the printer and changes the SVG to the size. For example, if the size of the output resolution obtained from the printer is 4000 px×3000 px, the SVG is rewritten as shown in FIG. 17B. In FIG. 17B, the width and height of the SVG are changed in accordance with the image size to be sent to the printer. More specifically, width on the fourth row is changed to "4000", and height is changed to "3000".

In step S805, the native layer 220 changes a description concerning the image in the SVG to a description using a block image group. Assume that in steps S407 and S506, a block image group is created by dividing an RGB image into an upper half and a lower half, which are saved to be accessible by "imageID_above.bmp" and "imageID_be-low.bmp". SVG obtained by changing the description concerning the image in the SVG shown in FIG. 17B to a description using the above-described two block images has a description as shown in FIG. 18A. In FIG. 18A, as described above, the description portion concerning the image is changed to a description using block images. In the block image group, data saved in a file is designated by a path. However, this can also be implemented using a method of including the entity of image data as BASE64. Note that construction of a print content using block images can be executed by one or both of the script layer 210 and the native layer 220. Note that in this embodiment, step S805 is executed because image division processing is performed in steps S407 and S506. However, if the image division processing is not performed, the process of step S805 may be skipped.

In step S806, the native layer 220 adds a marker to the SVG changed in step S805. Regarding the marker, an example in which a red band is added to the right end of the SVG a content will be described. In this embodiment, a red band is used. However, the marker is not limited to this, and any marker capable of discriminating added information can be used. Relative to the SVG shown in FIG. 18A, the SVG with the added red band has a description as shown in FIG. 18B. In FIG. 18B, the SVG of 4000 px×3000 px is surrounded by a larger SVG of 4005 px×3000 px. The difference corresponds to the region to add the red band. The red band serving as the marker is added as the last element of the SVG to execute drawing at last. Use of the red band will be explained concerning step S815.

In step S807, the native layer 220 determines a terminal state. In a mobile terminal, if an incoming call is received, or processing of activating another application is performed, control is done to make the application under execution operate on the background. If the application operating on the background continuously performs processing of heavy load, other applications may be influenced. To avoid this, a contrivance to reduce the load as much as possible is needed during the background state of the application. The terminal state determination in step S807 is to check whether the application is operating on the foreground or background in the information processing apparatus 115.

In step S808, the native layer 220 creates an SVG to render only a specific region from the SVG content. In the application, if a region in the size of 4000 px×3000 px is rendered at once, the load on the memory increases. If this processing can be divided into two steps of rendering, for example, 4000 px×1500 px, the memory utilization can be reduced. The SVG to render only a specific region aims at this memory saving. The SVG to render a specific region will be referred to as a band SVG hereinafter. An explanation will be made concerning step S808 assuming that it is determined that the application is operating on the foreground. In step S808, the native layer 220 creates, for example, the first band as shown in FIG. 19A. In FIG. 19B, pieces of information to operate x- and y-coordinates are added to the SVG (the fifth and 20th rows). The region of SVG to be drawn can be changed by changing the values of the x- and y-coordinates. In the first band, both the x- and y-coordinates are "0".

In step S809, the native layer 220 requests the OS layer 230 to generate a band size screen. Here, a region of 4005 px×1500 px is obtained from the first band SVG. Note that if there is a sufficient memory (resource), the region of 4005 px×3000 px may be rendered at once.

In step S810, the OS layer 230 executes generation of a screen for the band SVG (4005 px×1500 px). Information about the size of the band SVG is held by not the band SVG itself but the native layer 220. The screen is generated as an offscreen screen. The offscreen screen is a screen that is not displayed on a UI.

In step S811, the native layer 220 requests the OS layer 230 to draw the first band SVG on the screen generated in step S810.

In step S812, the OS layer 230 loads the information of the band SVG and executes drawing processing on the screen generated in step S810. Note that since the drawing processing is executed on the screen generated in step S810, this screen can also be called a frame. At the timing of loading the information of the band SVG, the native layer 220 can receive a load completion notification. This notification can be made using a function provided in the OS as a standard function. In, for example, the Objective-C language used in creation of an iOS application, the webViewDidFinishLoad function or the like corresponds to the function. In the Java language used in creation of an Android application, the onPageFInished function or the like corresponds to the function. The OS layer 230 processes the commands of the band SVG sequentially from the upper side. As is apparent from FIG. 19B, red band drawing is designated as the last command of the band SVG. Hence, the OS layer 230 draws the red band at last.

In step S813, the native layer 220 requests image information from the OS layer 230. The image information is RGBA data displayed on the screen. In short, step S813 means requesting execution of screen capture.

Figure 11A:
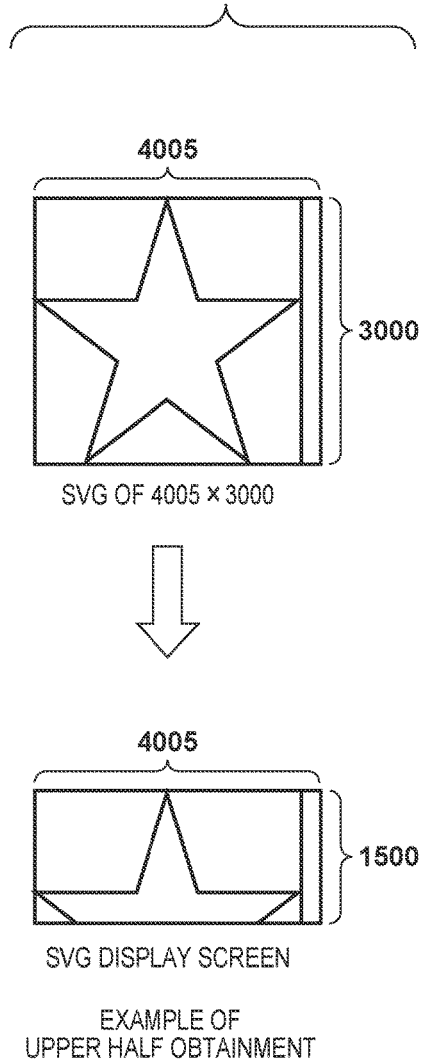
FIGS. 11A and 11B are views for explaining image obtainment from a band SVG according to the present invention.
Figure 11B:
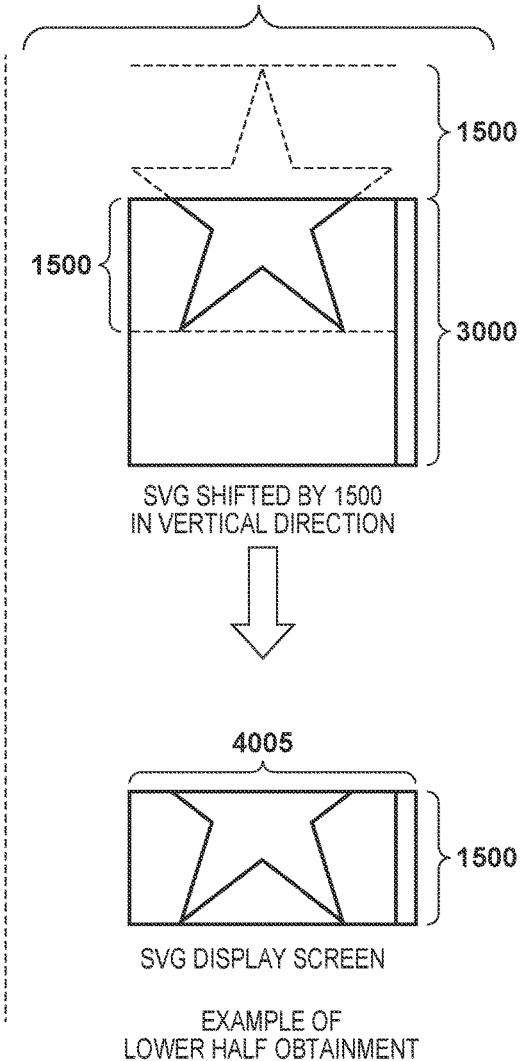

In step S814, in response to the request from the native layer 220, the OS layer 230 executes screen capture of the displayed screen, and sends the obtained RGBA information to the native layer 220. Here, the information of 4005 px×3000 px is described in the band SVG. However, the screen actually prepared by the OS layer 230 only has a size of 4005 px×1500 px. In this case, drawing is not executed for a portion off the prepared screen. With this characteristic, when the screen of 4005 px×1500 px is prepared, only the upper half (4005 px×1500 px) of 4005 px×3000 px defined by the band SVG is drawn. As a result, the native layer 220 can obtain only the information of the upper half (RGBA information of 4005 px×1500 px). FIG. 11A shows an example in which to obtain the RGBA information of the upper half, the information is loaded in a screen smaller than 4005 px×3000 px designated by the SVG description. Note that the band at the right end in FIGS. 11A and 11B corresponds to the red band according to this embodiment. The RGBA information of the upper half is obtained by the processing as shown in FIG. 11A. Applying this, when an SVG band shown in FIG. 19B in which the y-coordinate (more specifically, the value of the y-coordinate on the fifth row) is changed is loaded to the screen of 4005 px×1500 px, only the lower half of the SVG content can be obtained. For example, only the lower half of the SVG content can be obtained by changing the y-coordinate from 0 to 1500. FIG. 11B shows an example in which to obtain the RGBA information of the lower half, the screen smaller than 4005 px×3000 px designated by the SVG description is shifted in the y-coordinate direction, and the information is loaded to a screen smaller than the SVG description. The RGBA information of the lower half is obtained by the processing as shown in FIG. 11B.

In step S815, the native layer 220 confirms whether the right end of the obtained RGBA data is red. The load completion information is sent from the OS layer 230 to the native layer 220 in step S812. This timing is not the timing of SVG drawing completion but the timing of SVG data load completion. That is, there is a time lag between the SVG data load completion and the drawing completion. If screen capture is executed during this time, the image required cannot be obtained. Hence, the red band is added to the SVG data to be loaded and used as a criterion to determine whether the image required is obtained.

In step S816, the native layer 220 confirms whether the red band (marker) exists. If the red band cannot be confirmed (NO in step S816), the process returns to step S813. Then, the native layer 220 requests image information from the OS layer 230. That is, at this stage, the native layer 220 requests the information of the upper half (the RGBA information of 4005 px×1500 px) again. At this time, a contrivance may be made to redo the processing after waiting for a predetermined time to reduce the load on the CPU. If the red band (marker) is confirmed (YES in step S816), this represents that the OS layer 230 has completed the drawing on the screen of 4005 px×1500 px, and the processing in FIG. 8B advances to step S817.

In step S817, the native layer 220 requests the OS layer 230 to reset the screen.

In step S818, based on the request from the native layer 220, the OS layer 230 discards the screen. The screen discarding here has two meanings. First, the screen discarding is done to prevent the red band (marker) of the previous time from remaining at the time of next SVG band loading and prevent the native layer from erroneously recognizing drawing completion. Regarding this, the color or shape of the marker added for each band SVG may be changed. Second, the screen discarding is done because the size of the SVG band may be dynamically changed. An example in which the size of the SVG band is changed halfway through the processing will be described later.

In step S819, the native layer 220 converts the obtained RGBA data into a JPEG image. The RGBA data sent from the OS layer 230 to the native layer 220 in step S814 includes the information of A (degree of transparency) and the information of the red band (marker), which are unnecessary in print. For this reason, JPEG conversion is performed while excluding the two pieces of information.

In step S820, the native layer 220 adds a print command to be sent to the printer to the JPEG image generated in step S819. The data added to the JPEG image is generated based on the information of printer settings. If necessary, a command to control the printer may be added. Examples of the information to be added are information representing what is the ordinal position of the information to be sent as a band and a footer used to determine whether a band is the last band.

In step S821, the native layer 220 requests the OS layer 230 to send print information (print data to be used in print processing).

In step S822, the OS layer 230 sends the print information received from the native layer 220 to the printer. After the print information sending is completed, the process advances to step S824.

In step S823, the printer executes print based on the print information received from the information processing apparatus 115 (OS layer 230).

In step S824, the native layer 220 determines whether rendering has ended. The end of rendering is determined based on, for example, a fact that the sum of the heights of obtained images matches the height of the output size, a fact that a flag for end determination is set, or the like. Note that another determination method may be used. If rendering has not ended (NO in step S824), the process returns to step S807 to repeat the processing. If rendering has ended (YES in step S824), the process advances to step S825.

In step S825, the script layer 210 sends an indicator stop request to the OS layer 230.

In step S826, the OS layer 230 stops the indicator based on the request from the script layer 210, and ends the rendering & print processing.

In the above explanation, only data of 4000 px×1500 px of 4000 px×3000 px is created. Creation of data of the latter half will be described below. The description will be made assuming that when step S824 ends with "NO", and the process returns to step S807, it is determined that the application is being executed on the background. In the first band SVG, the image is obtained in the size of 4005 px×1500 px. However, during execution on the background, it is important to save the memory as much as possible, as described above.

In step S808, the native layer 220 executes the processing from step S808 based on the result in step S807. As described above, the memory utilization can be reduced by making the size of the image to be obtained small. Hence, the following description will be made assuming that the second band has a size of 4000 px×750 px. A description example of the SVG band is the same as in FIG. 19B.

As described above, the region to obtain data has the same size as that of the screen actually prepared by the OS layer 230. Hence, the band SVG itself can describe the information of 4005 px×3000 px. However, not to obtain the already obtained information again, the y-coordinate of the band SVG needs to be changed appropriately. That is, the native layer 220 obtains data from (0, 1500) to (4005, 2250) of 4005 px×3000 px. To do this, the y-coordinate on the fifth row in FIG. 19B is changed to 1500. As the method of displaying a specific region of the SVG, any method such as a method of operating the attribute viewBox of the SVG can be used.

In step S809, the native layer 220 requests the OS layer 230 to generate a screen of a size (4005 px×750 px) to obtain information. In steps S810 to S823, the same processes as described above are performed. With these processes, the native layer 220 can obtain RGBA information from (0, 1500) to (4005, 2250). In step S824, the native layer 220 determines whether rendering of all regions has ended. Here, since rendering of the screen of the size of 4005 px x 750 px remains, the process returns to step S807 to repeat the processing. The y-coordinate of the band SVG at this time is 2250. The subsequent processing is the same as described above, and a description thereof will be omitted.

According to this embodiment, it is possible to obtain a high-quality printed product even when printing a print content including a high-resolution image using a function of a web. Note that in this embodiment, a JPEG image is generated from obtained RGBA information, and the OS layer 230 is sequentially requested to send print information. However, another method may be used. For example, after all pieces of RGBA information are obtained, the native layer 220 may convert them at once into a JPEG image and request the OS layer 230 to send print information. Alternatively, after all JPEG images are generated, the native layer 220 may put them together to generate one JPEG image and request the OS layer 230 to send print information.

Second Embodiment

In step S406 (FIG. 12) of FIG. 4 described in the first embodiment, the division condition of rasterized RGB image into block images is decided from image information to be laid out in a content. In this embodiment, an example in which the division condition is decided from a combination with information of a portable terminal (here, an information processing apparatus 115) with installed software as well as image information will be described.

As terminal information, information (for example, information (for example, the type and version information of the OS) about the OS of the platform, the clock frequency of the CPU of the terminal, and the memory size of the terminal are used. As described at the outset, limitation of image display in a function of a web depends on the OS type or terminal performance, in particular, the memory size. For this reason, to decide division conditions, terminal information is obtained from the portable terminal using the function of the native. The terminal information obtained here can be obtained as, for example, printer information shown in FIG. 15B. In FIG. 15B, the memory size is obtained on the fifth row.

For example, tables corresponding to an OS type and version information, a memory size, and a CPU clock frequency as shown in FIG. 13 are held in a native layer 220 of an application. It is believed that the division conditions are changed depending on the OS type or version, the memory size, and the CPU clock frequency. All of these pieces of information may be used, or only some of them may be used. A division condition selected based on the version information and a condition selected based on the memory size do not necessarily match. In this case, a stricter division condition (as for the upper limit of the number of pixels in image division, a smaller number) is employed. For example, if the OS is A OS in version 9, and the memory size is 1024, the division conditions are decided as follows.

Image division: execute

Upper limit of number of pixels in division: 5,000,000

Note that the conditions and numerical values shown in the tables are merely examples, and the present invention is not limited to this. If the CPU clock frequency or memory size has a value that is absent in the table, the condition may be decided by interpolation, or a closer numerical value in the table may be used. The memory size and the CPU clock frequency are common to OSs. However, a different memory size or CPU clock frequency may be used depending on the OS. In this embodiment, a table is used. However, a method of deciding the division conditions depending on whether the memory size, the clock frequency, or the version information is equal to or more than a predetermined threshold may be used.

As described above, the division conditions can be decided in accordance with the performance of a portable terminal based on attribute information belonging to the terminal.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-069278, filed Mar. 30, 2016, which is hereby incorporated by reference herein in its entirety.

What is claimed is:

1. An information processing apparatus, comprising:
   at least one memory storing (i) an instruction set of an operating system, (ii) an instruction set of a first program layer of an application, containing instructions that require translation to be executable by a processor, and (iii) an instruction set of a second program layer of the application, containing instructions that have been translated in advance so as to be executable by a processor; and
   at least one processor that, upon executing instructions stored in the at least one memory, performs the functions of
   deciding a division condition of an image to be laid out in a print content based on at least one of information of the image and information of the information processing apparatus by causing at least one of the first program layer and the second program layer to operate;
   dividing the image in accordance with the division condition decided in the deciding and creating a divided image by causing the second program layer to operate;
   constructing the print content in which the divided image is laid out by causing at least one of the first program layer and the second program layer to operate;
   rendering the print content in which the divided image is laid out and generating a rendering image by causing the second program layer to operate;
   generating print data using the rendering image by causing the second program layer to operate; and
   sending the print data generated using the rendering image to a printer.

2. The apparatus according to claim 1, wherein the print content is described using a web standard language.

3. The apparatus according to claim 1, wherein the print content is described using one of SVG (Scalable Vector Graphics) and Canvas.

4. The apparatus according to claim 1, wherein the information of the image includes information of the respective numbers of vertical and horizontal pixels of the image.

5. The apparatus according to claim 1, wherein the information of the information processing apparatus includes at least one of information about an operating system, the number of clocks of the at least one processor, and size of the at least one memory.

6. The apparatus according to claim 1, wherein the division condition includes the number of divisions of the image and a pattern of division.

7. The apparatus according to claim 1, wherein the division condition is decided to divide the image to a size that does not exceed an upper limit of a resource limited by the operating system.

8. A method of controlling an information processing apparatus containing an application including a first program layer including an instruction set to be translated and executed by at least one processor and a second program layer including an instruction set to be translated in advance and executed by the at least one processor, comprising:
   deciding a division condition of an image to be laid out in a print content based on at least one of information of the image and information of the information processing apparatus by at least one of the first program layer and the second program layer;
   dividing the image in accordance with the division condition decided in the deciding and creating a divided image by the second program layer;
   constructing the print content in which the divided image is laid out by at least one of the first program layer and the second program layer;
   rendering the print content in which the divided image is laid out and generating a rendering image by the second program layer;
   generating print data using the rendering image by the second program layer; and
   sending the print data generated using the rendering image to a printer.

9. The method according to claim 8, wherein the print content is described using a web standard language.

10. The method according to claim 8, wherein the print content is described using one of SVG (Scalable Vector Graphics) and Canvas.

11. The method according to claim 8, wherein the information of the image includes information of the respective numbers of vertical and horizontal pixels of the image.

12. The method according to claim 8, wherein the information of the information processing apparatus includes at least one of information about an operating system, the number of clocks of the processor, and a memory size.

13. The method according to claim 8, wherein the division condition includes the number of divisions of the image and a pattern of division.

14. The method according to claim 8, wherein the division condition is decided to divide the image to a size that does not exceed an upper limit of a resource limited by an operating system provided in the information processing apparatus.

15. A non-transitory computer-readable medium storing a program including a first program layer including an instruction set to be translated and executed by a processor and a second program layer including an instruction set to be translated in advance and executed by the processor, the program causing a computer to function as:
   a decision unit configured to decide a division condition of an image to be laid out in a print content based on at least one of information of the image and information of the computer by at least one of the first program layer and the second program layer;

- a division unit configured to divide the image in accordance with the division condition decided by the decision unit and create a divided image by the second program layer;
- a construction unit configured to construct the print content in which the divided image is laid out by at least one of the first program layer and the second program layer;
- a rendering unit configured to render the print content in which the divided image is laid out and generate a rendering image by the second program layer;
- a generation unit configured to generate print data using the rendering image by the second program layer; and
- a sending unit configured to send the print data generated using the rendering image to a printer.

16. The medium according to claim 15, wherein the first program layer is described using a web standard language.

17. The medium according to claim 15, wherein the first program layer is described using one of HTML5, CSS3, and JavaScript.

18. The medium according to claim 15, wherein the information of the image includes information of the respective numbers of vertical and horizontal pixels of the image.

19. The medium according to claim 15, wherein the information of the information processing apparatus includes at least one of information about an operating system, the number of clocks of the processor, and a memory size.

20. The medium according to claim 15, wherein the division condition includes the number of divisions of the image and a pattern of division.

* * * * *